United States Patent [19]
Takahashi et al.

[11] Patent Number: 5,655,067
[45] Date of Patent: Aug. 5, 1997

[54] ANIMATION GENERATING METHOD IN A DESIGN SUPPORTING SYSTEM

[75] Inventors: Hisashi Takahashi, Sagamihara; Katsuhiko Yuura, Kodaira; Shoichi Kubo, Tokyo; Yasuhiro Sugawara, Yokohama, all of Japan

[73] Assignees: Hitachi, Ltd.; Hitachi ULSI Engineering Corporation, both of Tokyo, Japan

[21] Appl. No.: 284,005

[22] Filed: Aug. 1, 1994

[30] Foreign Application Priority Data

Aug. 3, 1993 [JP] Japan ................................. 5-210955

[51] Int. Cl.$^6$ ................................................. G06T 5/50
[52] U.S. Cl. ............................................................. 395/173
[58] Field of Search ............................... 395/152, 155, 395/161

[56] References Cited

U.S. PATENT DOCUMENTS

| | | | |
|---|---|---|---|
| 5,111,409 | 5/1992 | Gasper et al. | 395/152 |
| 5,214,758 | 5/1993 | Ohba et al. | 395/152 X |
| 5,247,610 | 9/1993 | Oshima et al. | 395/152 |
| 5,377,319 | 12/1994 | Kitahara et al. | 395/152 X |
| 5,404,437 | 4/1995 | Nguyen | 395/152 |
| 5,416,899 | 5/1995 | Poggio et al. | 395/152 |
| 5,459,829 | 10/1995 | Doi et al. | 395/152 |

FOREIGN PATENT DOCUMENTS 3-271934A  3/1990  Japan .

OTHER PUBLICATIONS

Katsuhiko Yuura, et al. "Odette: A Building Environment for Object–Oriented Design Tool," Informaton Processing Society of Japan, May 1991, pp. 1–11. (provided in Japanese).

Daniel G. Bobrow, et al. "Common Lisp Object System," ANSI X3J13 Document 99–002R, 1988, pp. 770–864. (provided in English).

*Primary Examiner*—Phu K. Nguyen
*Assistant Examiner*—Cliff N. Vo
*Attorney, Agent, or Firm*—Fay, Sharpe, Beall, Fagan, Minnich & McKee

[57] ABSTRACT

In an animation generating method wherein a component of an apparatus to be designed is defined by an instance of an object-oriented program and a figure is allocated to said instance on a computer, and further an animation method for varying a representation of said figure in connection with the operation of the instance is interactively generated, a designation is made of either a slot of said instance, or a method argument of a method effected to said instance, and further a designation is made of a figure attribute of a figure to be changed in an animation representation. In response to this, an animation method for changing the figure attribute is automatically generated with refererence to the slot of the instance, or the method argument of the method effected to the instance.

16 Claims, 29 Drawing Sheets

FIG. 1

100 DESIGN SUPPORTING PROCEDURE OF PRESENT INVENTION

- 201 GENERATE FUNCTION CLASS DEFENITION, AND SET FUNCTION INFORMATION TO FUNCTION CLASS
- 101 GENERATE DISPLAY CLASS DEFINITION ON APPLICABLE GRAPHIC EDITOR
  - 203 INPUT FIGURE
- 102 SET FUNCTION INFOMATION TO FUNCTION CLASS, AND FIGURE INFORMATION TO DISPLAY CLASS ON ANIMATION PROGRAM EDITOR
  - 103 GENERATE AND SET ANIMATION INITIATING METHOD BY DESIGNATING METHOD AND TIMING
  - 104 GENERATE AND SET ANIMATION METHOD DEFINITION BY DESIGNATING FIGURE ELEMENT AND BY MENU OPERATION
- 208 MODELING BY INSTANCE ON APPLICABLE GRAPHIC EDITOR
  - 209 DRAW FIGURE
- 210 SIMULATION
  - 211 EXECUTE METHOD OF FUNCTION CLASS
- 212 DISPLAY RESULT
  - 213 EXECUTE ANIMATION INITATING METHOD
  - 214 EXECUTE ANIMATION METHOD
  - 215 CALL TO UPDATE DISPLAY SLOT

303 APPLICABLE GRAPHIC EDITOR

FIG. 5

304 ANIMATION PROGRAM EDITOR

- ANIMATION INITIATING METHOD DEFINITION GENERATING UNIT — 501
- ANIMATION METHOD DEFINITION GENERATING UNIT — 502
  - DEFINITION GENERATING UNIT OF DISPLAY SLOT — 503
  - DISPLAY SLOT UPDATING FORMULA GENERATING UNIT — 504
    - DISPLAY SLOT UPDATING FORMULA GENERATING UNIT BY ATTRIBUTE OF CORRESPONDING FUNCTION CLASS — 505
    - DISPLAY SLOT UPDATING FORMULA GENERATING UNIT BY METHOD ARGUMENT OF FUNCTION CLASS — 506
    - DISPLAY SLOT UPDATING FORMULA GENERATING UNIT BY ATTRIBUTE INPUTTED FROM KEYBOARD — 507
    - DISPLAY SLOT UPDATING FORMULA GENERATING UNIT BY FIGURE ATTRIBUTES OF OTHER FIGURE ELEMENTS — 508

FIG. 6

600 DESCRIPTION EXAMPLE OF FUNCTION CLASS DEFINITION <TELEPHONE>

```
(defclass TELEPHONE ( )
  (( ID NUMBER      : initform 0)
   ( CONDITION      : initform "sleep")
   (TELEPHONE NUMBER: initform nil)
   (CONNECTION LINE : initform nil)))
```
— 601

```
(defmethod TO DIAL
  ((object TELEPHONE) (tel-no string)
  (TO TRANSMIT object tel-no))
```
— 602

FIG. 7A

305 FUNCTION CLASS DEFINITION <TELEPHONE>

| SLOT DEFINITION GROUP | ~700 |
| METHOD DEFINITION GROUP | ~701 |

FIG. 7B

700 SLOT DEFINITION GROUP <TELEPHONE>

| ID number | : initform 0 | ~702 |
|---|---|---|
| condition | : initform "sleep" | ~703 |
| telephone number | : initform nil | ~704 |
| connection line | : initform nil | ~705 |
| figure | : initform nil | ~706 |

FIG. 7C

701   METHOD DEFINITION GROUP <TELEPHONE>

| | | |
|---|---|---|
| to dial | ((object telephone  (tel-no string))) | ~710 |
| | ( to transmit   object tel-no) | ~707 |
| to dial : before | ((object telephone  (tel-no string))) | ~708 |
| | (with-slots (figure) object (to dial-display figure tel-no)) | ~709 |

FIG. 8A

308 DISPLAY CLASS
　　 DEFINITION (TELEPHONE FIGURE)

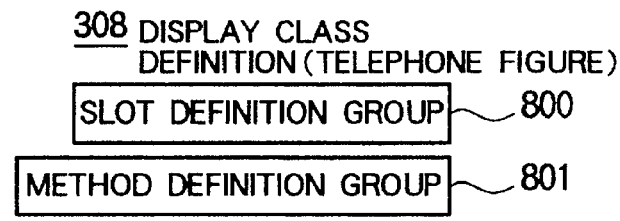

FIG. 8B

800 DISPLAY SLOT DEFINITION GROUP <TELEPHONE FIGURE>

| function | : initform nil | 802 |
|---|---|---|
| px | : initform 0 | 803 |
| py | : initform 0 | 804 |
| graphic | : allocation : class<br>　　: initform<br>　　#'(lambda (object)<br>　　　 (with-slots<br>　　　　 (px py　　　　　　　　　　　　　　　object<br>　　　　 (draw rectangle :x (+0 px) :y (+0 py) :dx 10 :dy 10)<br>　　　　 (draw rectangle :x (+1 px) :y (+1 py) :dx 3 :dy 8)<br>　　　　 (draw rectangle :x (+5 px) :y (+5 py) :dx 4 :dy 4)<br>　　　　　　　　　　　　　　　　　　　　　:pattern grid)<br>　　　　 (draw character :x (+6 px) :y (+6 py)<br>　　　　　　　　　　　　　　　:string "＿＿＿＿＿＿"<br>　　　　　　　　　　　　　　　:style :normal )<br>　　　　 (draw character :x (+6 px) :y (+3 py)<br>　　　　　　　　　　　　　　　:string " 00-0000"<br>　　　　　　　　　　　　　　　:style :normal ))) | 808 |

FIG. 8C

800 DISPLAY SLOT DEFINITION GROUP <TELEPHONE FIGURE>

| function | : initform nil | 802 |
|---|---|---|
| px | : initform 0 | 803 |
| py | : initform 0 | 804 |
| text1 | : initform " _____ " ~824 | 805 |
| text2 | : initform " 00-0000" ~825 | 806 |
| text3 | : initform [: normal]~826 | 807 |
| text4 | : initform [: normal]~827 | 823 |
| graphic | : allocation : class<br>: initform<br>  #'(lambda (object)<br>   (with-slots   /811  /812  /813  /814<br>    (px py [text1] [text2] [text3] [text4] ) object<br>   (draw rectangle :x (+0 px) :y (+0 py) :dx 10 :dy 10)<br>   (draw rectangle :x (+1 px) :y (+1 py) :dx 3 :dy 8)<br>   (draw rectangle :x (+5 px) :y (+5 py) :dx 4 :dy 4)<br>    :pattern GRID)<br>   (draw character :x (+6 px) :y (+1 py)<br>    [:string text1]~815<br>    [:style text4])~816<br>   (draw character :x (+6 px) :y (+3 py)<br>    [:string text2]~817<br>    [:style text3])))~818 | 808 |

FIG. 9

801 METHOD DEFINITION GROUP <TELEPHONE>

| display | ((object telephone figure xy)<br>   (with-slots (graphic px py) object<br>    (setf px x py y)<br>    (funcall graphic object) | ~809 |
|---|---|---|
| pn-args | ((object telephone figure (name symbol))<br><DISPLAY SLOT REFERENCE PROCESS> | ~830 |
| setf-args | ((value t) (object telephone figure(name symbol))<br><display slot update process><br>(with-slots (px py) object<br>(display object px py) | ~831 |
| to dial-display | ((object telephone figure (tel-no string))<br>  819<br>  (with-slots (function) object<br>    (with-slots (condition) function  ~840<br>     (setf (pn-args object ' text1) condition )))<br>  (setf (pn-args object ' text2) tel-no ) ~820 / ~841<br>  (setf (pn-args object ' text3) :italic ) ~821 / ~842<br>  (setf (pn-args object ' text4) ~822<br>    (pn-args object ' text3) ) ~843 | ~810 |

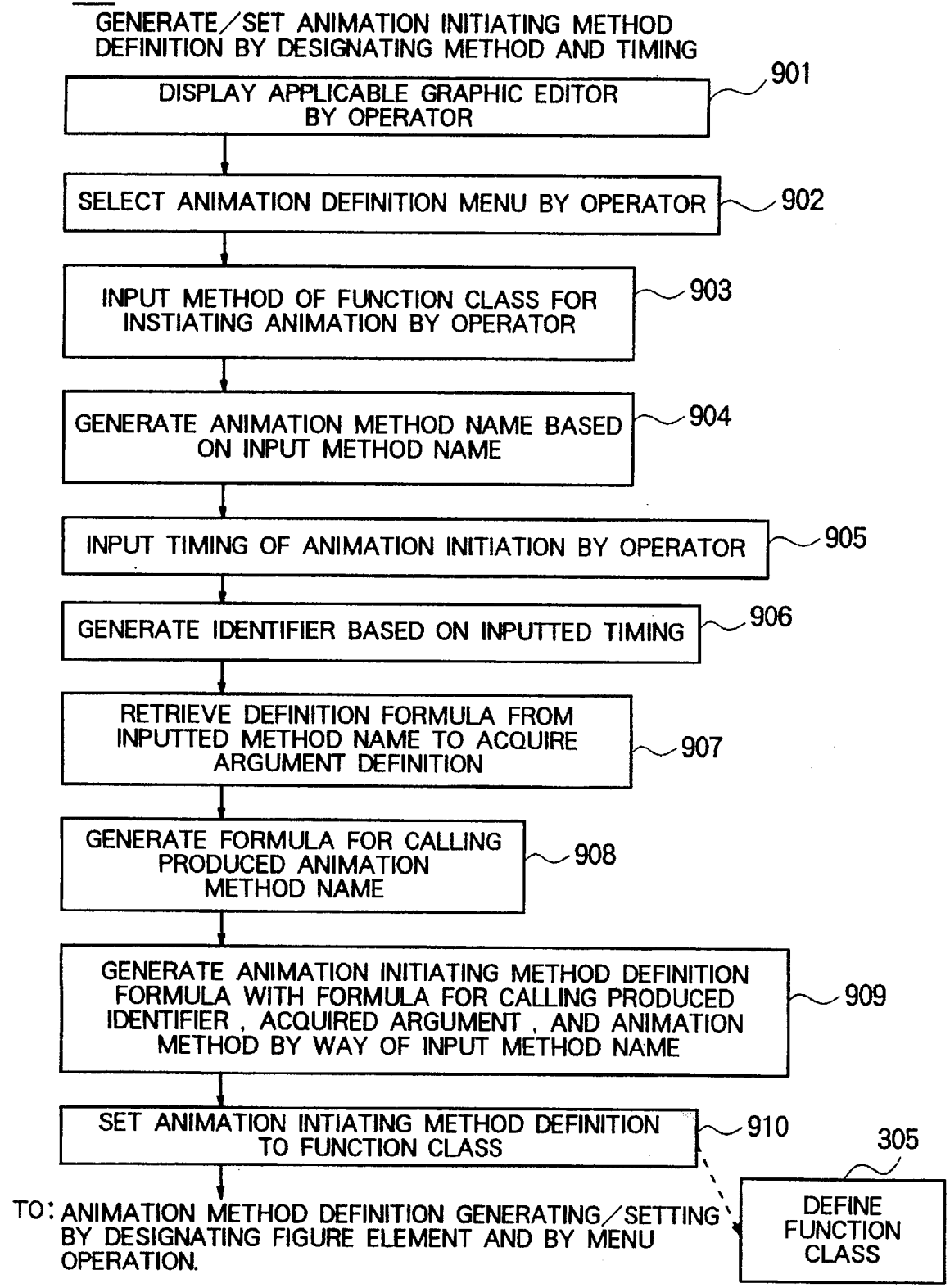

INPUT METHOD NAME TO INITIATE ANIMATION >> TO DIAL

INPUT TIMING (BEFORE, OR AFTER) OF ANIMATION INITIATION

1305 GENERATION OF DISPLAY SLOT UPDATING FORMULA WITH USE OF ATTRIBUTE OF FUNCTION CLASS

1310 GENERATING OF DISPLAY SLOT UPDATING FORMULA WITH EMPLOYMENT OF METHOD ARGUMENT OF FUNCTON CLASS

1313 GENERATING OF DISPLAY SLOT UPDATE FORMULA WITH EMPLOYMENT OF ATTRIBUTE INPUT FROM KEYBOARD

1316 GENERATING OF DISPLAY SLOT UPDATING FORMULA WITH EMPLOYMENT OF OTHER FIGURE ELEMENT ATTRIBUTES

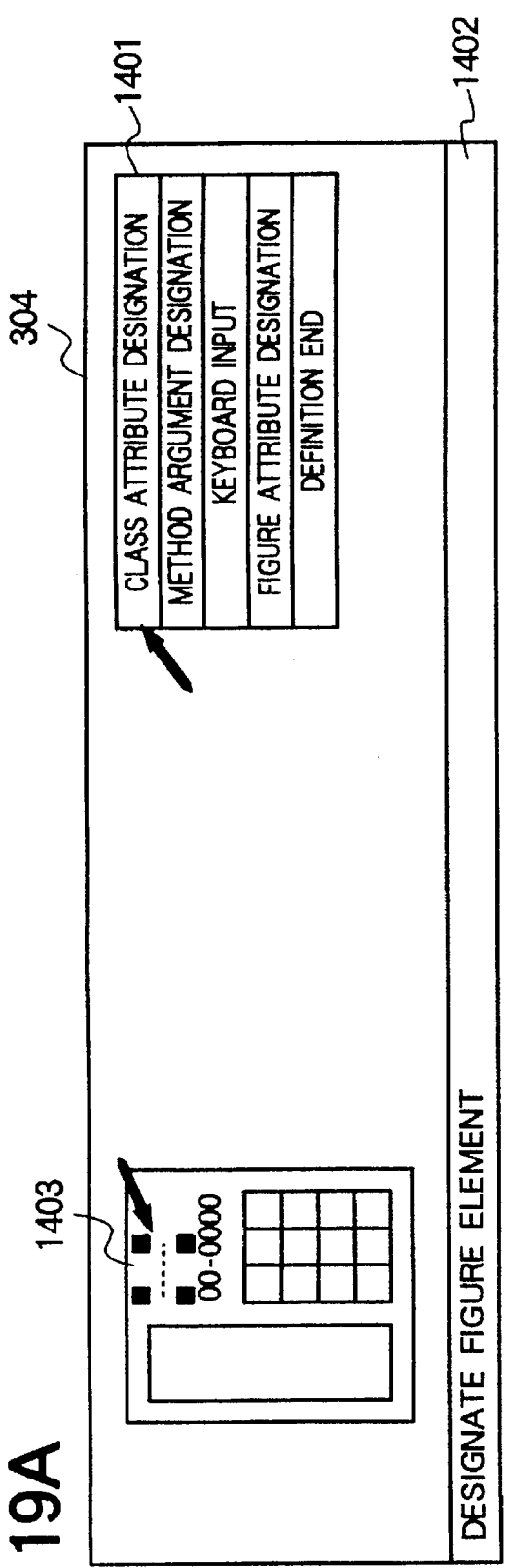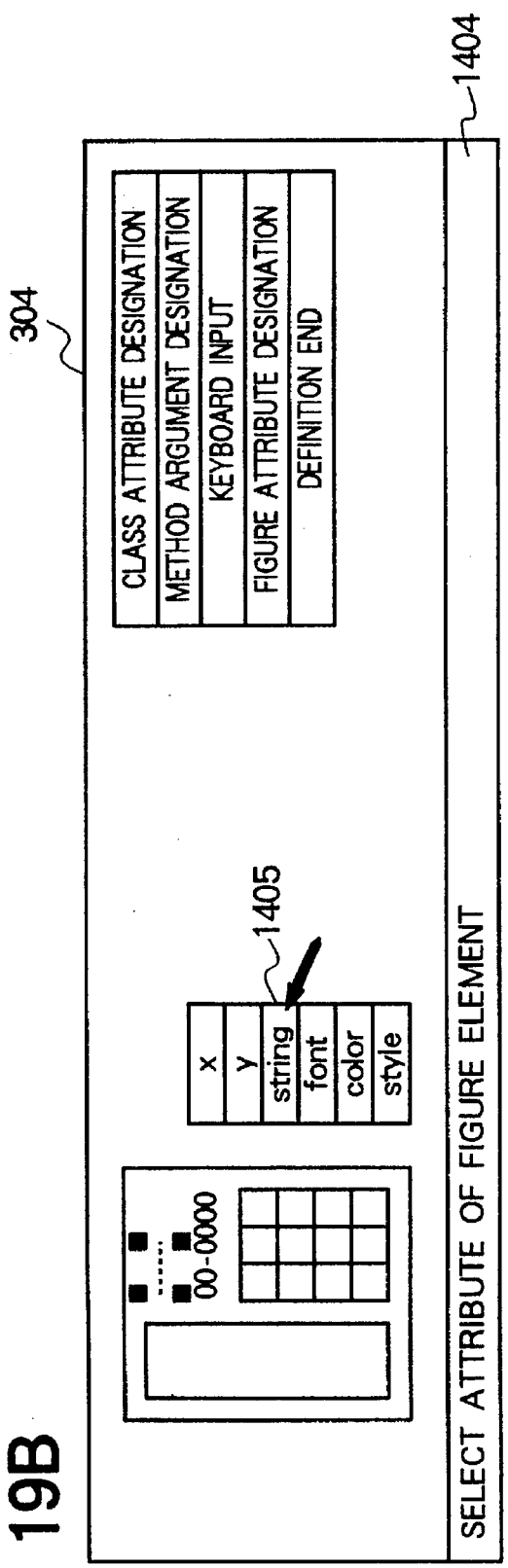

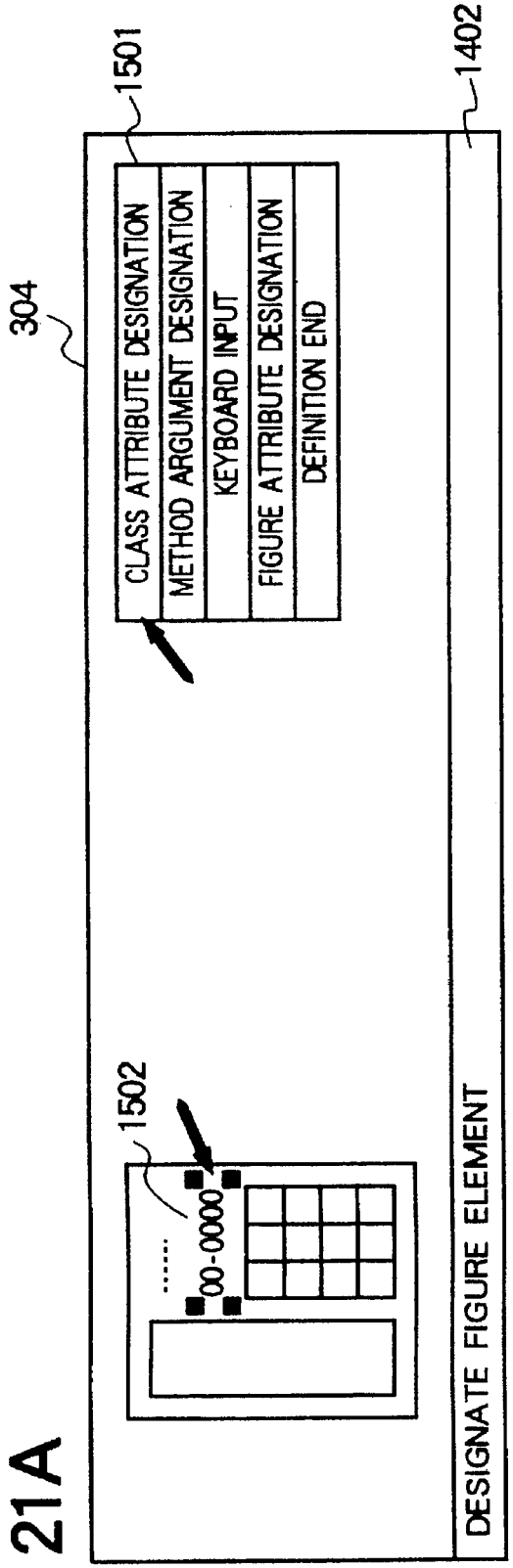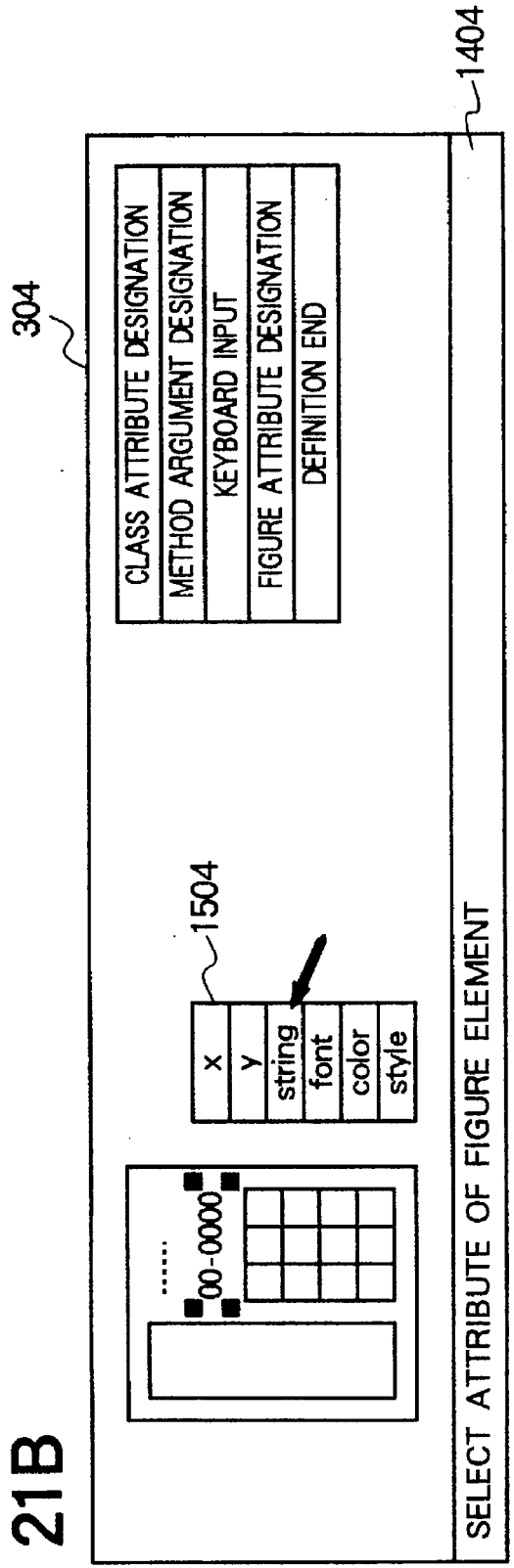

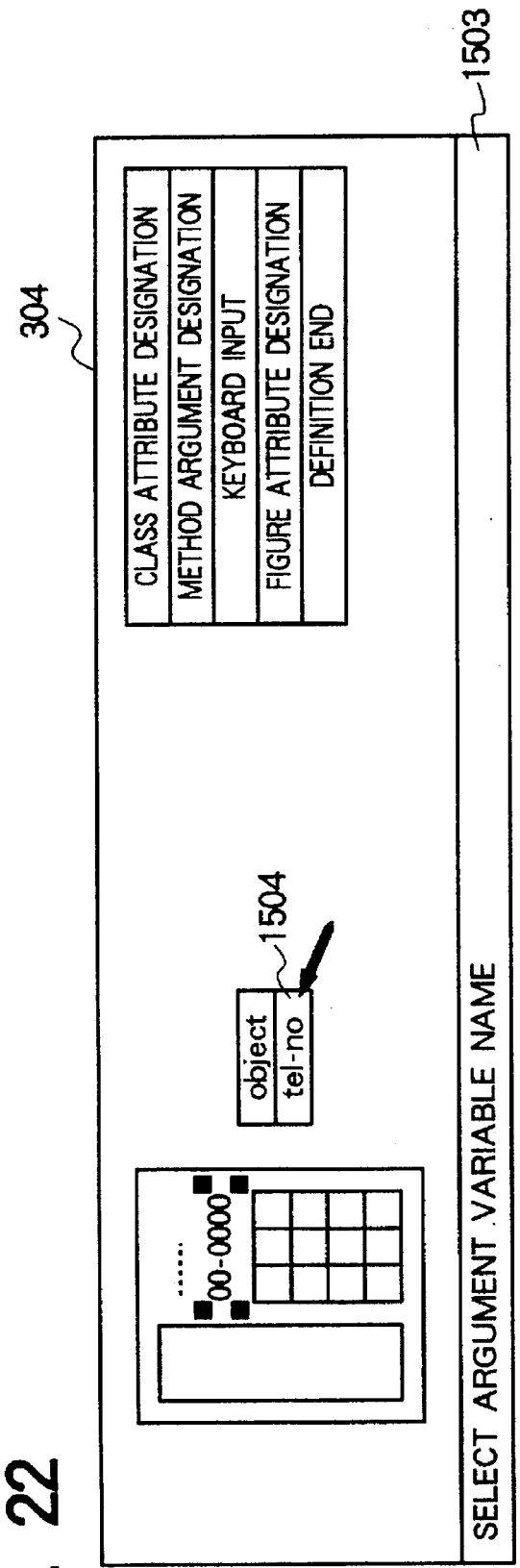

ANIMATION GENERATING METHOD IN A DESIGN SUPPORTING SYSTEM

CROSS-REFERENCE TO RELATED APPLICATIONS

This application relates to U.S. Ser. No. 07/852,768 filed by Yuura, et al on Mar. 17, 1992 and assigned to the present assignees. The disclosure of that application is incorporated herein by reference.

BACKGROUND OF THE INVENTION

The present invention relates to an animation generating method in a design supporting system utilized to design various types of apparatuses and of software. In particular, the present invention concerns such a method that a component of a design objective system is recognized as an instance of an object oriented program, and a variation in the instances is displayed as an animation.

In development of electronic apparatuses such as a computer, a support by software is necessarily required. In particular, it is important for an investigating stages of a new model and also a new system that various constructive sketches of the apparatuses are inputted as models; a simulation is carried out; a simulation result is evaluated; and the above-described operations are repeated so as to reconsider a design policy. Also, it is important that the design policy is correctly transferred to relevant staff members with easy understandings.

Similarly, also in development of a software application system, a model is interactively manufactured at a designing stage for a demanded specification. Then, it is the major work to show this model to a client.

An object-oriented language is to provide methodology for constituting software in which an "object" is used as a component, and owns a high applicability to a design matter. A basic element of an object-oriented language program is defined by a class. In a class definition, both a slot group as a variable of this class, and a method group corresponding to a procedure related to this class are defined.

A concrete program element in accordance to this class definition is called as an "instance". There is provided a class corresponding to a sort of a component contained in an object to be designed, in which an attribute of this component and an element thereof are defined as a slot, whereas an effect of a component is defined as a method. Then, a model having various objects is architected by combining the instances of the class, and then a simulation is performed by initiating the method.

To effectively utilize the above-described object-oriented type simulator, an improvement in the interface is expected when an instance is inputted and a result of a simulation is outputted. As to an input of an instance, it is important that the instance input is available in the interactive mode, and also both the component and entire model under input operation can be easily grasped. Accordingly, it is expected to enter an instance in a form of figure.

In view of easy representation of a function of a design model, not only a structure of this model is illustrated, but also an operation of a simulation is displayed by way of animation.

With respect to both the figure input/output of the instance, and also the object-oriented design support by the figure input/output, it is described in, for instance, the literature on Object-Oriented Software Technique Symposium held by Information Processing Society of Japan, entitled "ODETTE: Object-Oriented CLOS Based Design Supporting Architecture Environment" pages 1 to 11, (1991). In this relevant technique, setting of the animation is executed by described in the program both the method definition to initiate the animation and the method definition for the animation.

On the other hand, JP-A-3-271934 (1991) discloses a software design supporting system such that verification of the software design is supported by representing the animation indicative of the data transfer/receive conditions between the modules based on the design information. That is, when a definition is made of an actor (i.e., unit of process corresponding to module of program) and a script (to define detailed contents of actor) based upon a predetermined grammar, and then they are executed, a data flow is displayed as an animation.

SUMMARY OF THE INVENTION

In the software design supporting system described in the above-described JP-A publication, the internal conditions of the respective actors other than the data flow and also the external conditions of the apparatus to be designed could not be represented as animations. Further, there is no description with regard to changing of the animation display method. To effectively perform the animation representation in the object-oriented simulator, a decision is made of one proper animation display method by trying the animation display methods many times. To this end, the animation program must be produced many times. However, generally speaking, it is not easy to produce this animation program. For example, to generate an animation program, display slots used in this animation method must be defined in advance. Also, values to be set into the display slots, namely reference values must be investigated and then decided. When, for instance, an attribute name of a function class corresponding to a display slot is set to the display slot used in the animation method, this attribute name must be investigated and then set thereto. A similar investigation is required to such a case that an argument of a method for cooperating an animation, and names of display slots about other figure attributes are referred to, and such a work would become cumbersome and complex, and therefore could not be readily performed.

An object of the present invention is to realize such a design supporting system capable of easily performing the above-explained display slot definition and also animation program formation in an interactive manner, whereby workloads to generate the animation could be reduced.

Another object of the present invention is to provide an animation method producing method in such a design supporting system that an animation program per se need not be again described every time a representation of simulation results about an apparatus to be designed is varied, and the representation can be changed with flexibility.

To achieve the above-described objects, according to the present invention, in an animation generating method wherein a component of an apparatus to be designed is defined by an instance of an object-oriented program and a figure is allocated to said instance on a computer, and further an animation method for varying a representation of said figure in connection with the operation of said instance is interactively generated, this animation generating method is featured by comprising the steps of:

designating either a slot of said instance, or a method argument of a method effected to said instance;
designating a figure attribute of said figure; and generating animation method for setting and changing said figure attitude with reference to either said slot of the instance, or said method argument of the method effected to said instance.

The designation of either the slot or the method argument may be achieved by representing them as list menu, and these slot and method argument are selected from this menu.

The attribute values may be entered so as to be utilized, or the figure attribute values of other figures may be designated so as to be utilized instead of designating the slot of the instance, or the method argument of the method effected to the instance.

Furthermore, these slot, or method argument, inputted attribute value, otherwise the figure attributes of designated figures may be converted by a predetermined converting formula for use purposes.

The animation initiation method for initiating the produced animation method designates the method of the instance, and also designates at which timing before or after the designated method, the animation method is initiated. Such an animation method that the animation method is initiated at this designated timing is produced. Furthermore, only when a preselected initiation condition is satisfied, the animation method may be initiated.

Furthermore, an animation generating method according to the present invention is featured by comprising the steps of:

generating a function class of an object-oriented program for defining a component of an apparatus to be designed on a computer;

generating a display class for entering a figure corresponding to said function class and for defining said figure;

designating a method of said function class and timing of animation initiation;

producing an animation name corresponding to said designated method, and producing an animation initiating method for initiating an animation method of said animation method name at designated animation initiation timing, said produced animation name and said produced animation initiating method being set to said function class;

designating a figure element of a figure corresponding to said function class and also a figure attribute of said figure element, setting a display slot for designating said figure attribute of the figure element to a display class, and updating a figure definition of the display class with reference to said display slot;

designation either a slot variable of said function class, or a method argument of a method;

generating an updating formula for updating said display slot with employment of said designated slot variable, or said designated method argument, and generating an animation method containing said updating formula, said updating formula and said animation method being set to said display class; and performing modeling by an instance of said function class, and executing the method of said function class, whereby a simulation is carried out and a simulation result is displayed.

In a concrete example, an animation program editor with an expanded animation initiation method generating function and an expanded animation method generating function is employed with the normal graphic editor, and the animation program may be generated in an interactive operation.

The operations of this animation program editor are defined as the following steps of:

a) requesting an operator to designate a function method cooperative with initiation of an animation by displaying a message on said terminal;

b) after the function method cooperative with the initiation of the animation is designated, generating a function method having a formula for calling an animation method as either a postprocessing method of said designated function method, or a preprocessing method thereof, said generated function method being added and set into said first method definition group;

c) requesting an operator to designate a figure element to be displayed as an animation among figure elements for constructing the figure of said component;

d) after the figure element to be displayed as an animation is designated, requesting the operator to designate an attribute of a figure element to be changed in an animation while displaying the attribute of said figure element on said terminal in a menu form;

e) after the attribute of the figure element to be changed is designated, generating a discriminatable display slot name, adding an additional display slot with said display slot name, and changing a description of a figure definition of said figure element within the display slot for defining said figure format into a description for referring to said additional display slot;

f) requesting the operator to designate an attribute which is referred to so as to update said additional display slot;

g) after the attribute which is referred to so as to update said additional display slot is designated, generating an updating formula of said additional display slot with employment of said attribute; and h) adding and setting an animation method containing the generated updating formula into said second method definition group.

In accordance with the above-described method of the present invention, the operator can produce the animation in the interactive manner as follows:

First, the operator designates the method of the instance for the function class cooperative with the animation, and furthermore designates the initiation timing. As a result, the animation initiating method for initiating the animation method is produced as the preprocessing method of the function class, or the postprocessing method thereof.

When the operator selects the attributes of the figure corresponding to the instance of this function class, for example, lengths, color, patterns, character strings of the figure elements, the display slot definition is generated and then set to the display class of the user figure. Then, when such a designation is made of an attribute name of the corresponding function class, an argument name of a method for the cooperative function class, and attribute names of other figures, such an animation method is produced which updates the value of the display slot based upon the designated attribute value, thereby modifying this figure.

BRIEF DESCRIPTION OF THE DRAWINGS

FIG. 1 is a flow chart for indicating a design supporting sequence according to an embodiment of the present invention;

FIG. 5 schematically indicates a structural diagram of the animation program editor of FIG. 3;

FIG. 6 schematically represents a definition describing example for a function class of a telephone in the embodiment;

FIGS. 7A, 7B and 7C schematically show examples for the structure of the function class definition, the slot definition group, and the method definition group shown in FIG. 3;

FIGS. 8A, 8B and 8C schematically indicate examples for the structure of the display class definition, and the definition group of the display slot shown in FIG. 3;

FIG. 9 schematically shows an example of the method definition group of the display class definition shown in FIG. 3;

FIG. 10 is a flow chart for indicating a detailed sequence to produce and set the animation initiating method definition by the method and timing designation operation of FIG. 1;

FIGS. 19A, 19B and FIG. 20 schematically show terminal screen display samples when the display slot updating formulae are produced with employment of the respective function class attributes;

FIGS. 21A, 21B and FIG. 22 schematically show terminal screen display samples when the display slot updating formulae are produced with employment of the method arguments of the respective function classes;

DESCRIPTION OF THE PREFERRED EMBODIMENTS

Figure 3:
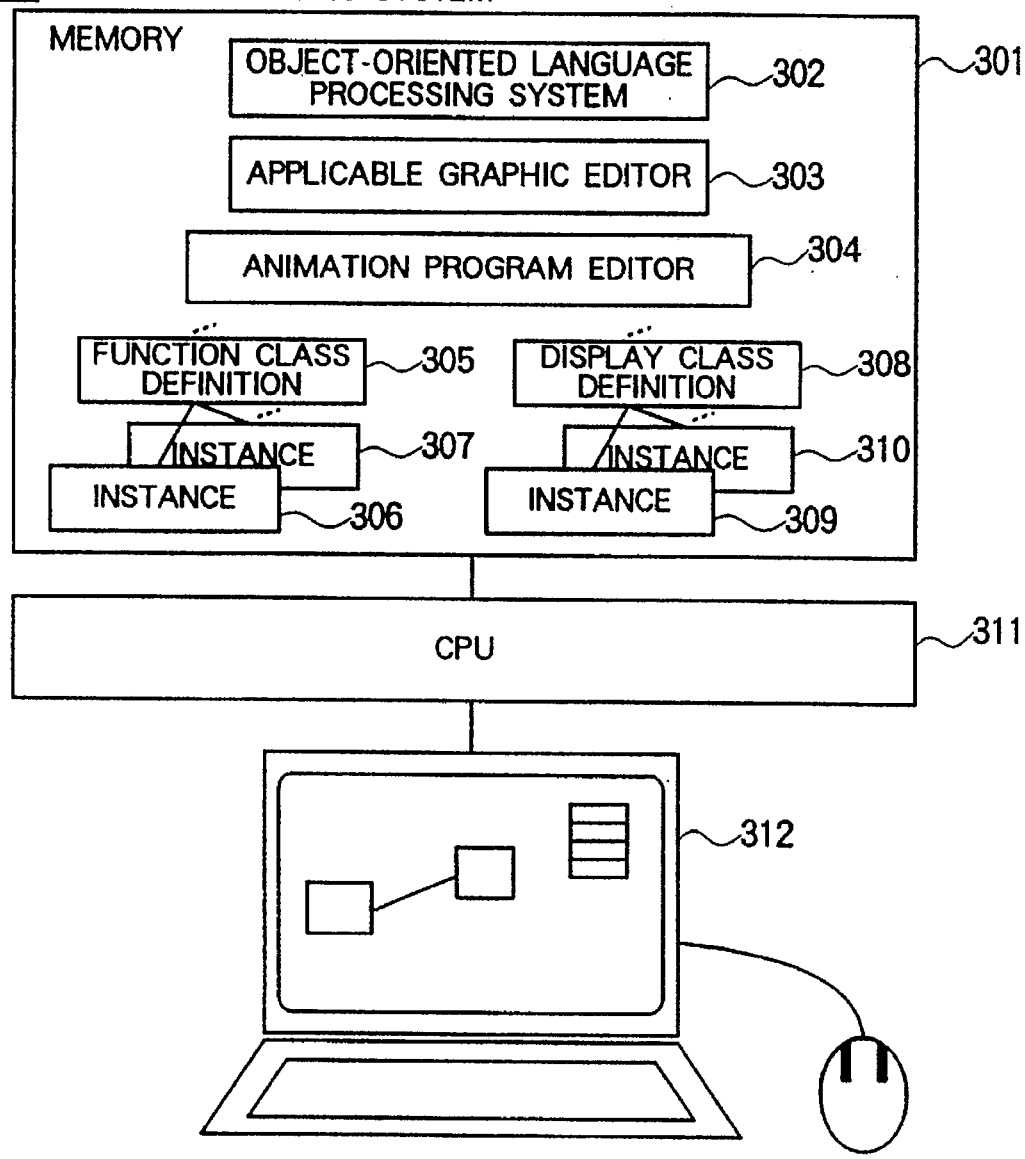
FIG. 3 is a schematic diagram for representing an arrangement of a design supporting system employed in the above-described embodiment.

FIG. 1 is a flow chart for representing a design supporting sequence according to an embodiment of the present invention. FIG. 3 schematically illustrates an arrangement of a design supporting system used in this embodiment. Before describing the procedures of FIG. 1, the design supporting system according to this embodiment will now be summarized.

A design supporting system 300 employed in the design supporting procedure 100 (FIG. 1) of this embodiment is comprised of a memory 301, a CPU (central processing unit) 311, and a terminal 312. An object-oriented language process system 302, an applicable graphic editor 303 and an animation program editor 304 are mounted on the memory 301. Class definitions 305, ..., display class definitions 308, ..., and instances 306, 307, 309, 310, ..., of the respective classes are produced by operating these components in accordance with the design supporting procedure 100.

The object-oriented language process system 302 is such a language process system capable of satisfying the specification of CLOS (Common Lisp Object System), and owns various functions such as a class definition, an instance production, a generic function control, and a slot access. The content of the CLOS language specification is represented in, for instance, D. G. Bobrow, et al., "Common Lisp Object System Specification", ANSIX 3J13 Document 88-002R (1988).

Figure 4:
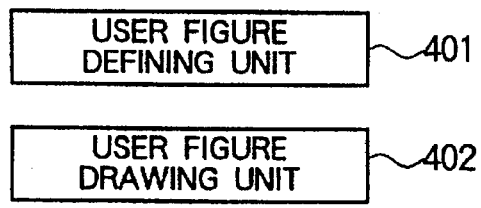
FIG. 4 schematically shows a structural diagram of an applicable graphic editor.

As the applicable graphic editor 303, such a graphic editor is employed as described in the prior art "ODETTE: Object-Oriented CLOS Based Design Supporting Architecture Environment" pages 1 to 11, (1991) in Object-Oriented Software Technique Symposium held by Information Processing Society of Japan. The applicable graphic editor 303 includes, as shown in FIG. 4, a user figure defining unit 401 and a user figure drawing unit 402.

The user figure defining unit 401 supports a definition of a user figure made by an operator. The operator generates the user figure by using a mouse to define a display class, and designates the corresponding function class. Then, the produced figure definition data is stored in the display class.

The user figure drawing unit 402 displays the user figure produced by the user figure produced by the user figure defining unit 401 in response to the designation made by the operator, to thereby produce one of instances of the function classes, corresponding to the relevant user figure.

As shown in FIG. 5, the animation program editor 304 is arranged by an animation initiating method definition generating unit 501 and an animation method definition generating unit 502. The animation method definition generating unit 502 is constructed of a display slot definition generating unit 503 and a display slot updating formula generating unit 504. Then, the display slot updating formula generating unit 504 includes a display slot updating formula generating unit 505 by an attribute of the relevant function class, a display slot updating formula generating unit 506 by a method argument of a function class, a display slot updating formula generating unit 507 by an attribute value inputted from a keyboard, and also a display slot updating formula generating unit 508 by a figure attribute of another figure element.

The animation initiating method definition generating unit 501 generates a method for initiating an animation. The method for initiating the animation is produced in correspondence with one method of the function class, and is executed before, or after this one method is performed.

More specifically, first of all, an operator designates both a method name of the function class and timing to initiate an animation (timing before or after method of this function class). In response to this designation, the animation initiating method definition generating unit 501 produces one method defining formula having a formula for calling an animation method (will be discussed later) as either a preprocessing method, or a postprocessing method of a function class. Then, this animation initiating method definition generating unit 501 stores the produced method defining formula into the function class thereof.

In the animation method generating unit 502, a display slot is first defined in the display slot definition generating unit 503. Thereafter, in the display slot updating formula generating unit 504, one method defining formula having a plurality of formulae for updating a display slot is produced and stored in the display class thereof.

The display slot definition generating unit 503 is to set the display slot corresponding to the user figure defined by the user figure defining unit 401 of the applicable graphic editor 303. In other words, when the user designates any of figure elements about the user figures, the display slot definition generating unit 503 requests the user to designate any of figure attributes while displaying a figure attribute menu. Upon designation of the figure attribute, the display slot definition generating unit 503 generates such a definition formula for setting its figure attribute as a display slot, and sets the generated definition formula into the display class thereof.

The slot updating formula generating unit 505 by the attribute of the corresponding function class generates such a formula to update the display slot defined by the display slot definition generating unit 503 based on the attribute value of the relevant function class. That is, this display slot updating formula generating unit 505 requests the operator to designate any of attribute names of a menu in which the attributes of the corresponding function classes are displayed. When the attribute name is designated, a formula is generated which updates the display slot by the value obtained by referring to this attribute.

The display slot updating formula producing unit 506 by the method argument of the function class generates such a formula for updating the display slot defined by the display slot definition generating unit 503 based upon the argument value of the method for the function class designated in the animation initiating method definition generating unit 501. In other words, this display slot updating formula generating unit 506 displays the argument of the method definition of the relevant function class, and requests the operator to designate any of the argument names of this menu. When the argument name is designated, the formula is generated by which the display slot is updated by the value used to refer to this argument.

The display slot updating formula generating unit 507 by the attribute value entered from the keyboard generates such a formula for updating the display slot defined by the display slot definition generating unit 503 based on the value entered by the keyboard. In other words, when the attribute value is entered by the operator via the keyboard, this display slot updating formula generating unit 507 produces the formula for updating the display slot based upon this attribute value.

The display slot updating formula generating unit 508 by figure attributes of other figure elements generates such a formula for updating the display slot defined by the display slot definition generating unit 503 based on the figure attribute values of other figure elements. That is, when a designation is made by the operator about any of the figure elements of the user figures, the display slot updating formula generating unit 508 represents the figure attribute menu and requests the user to select the proper figure attribute. When this figure attribute is designated, the display slot updating formula generating unit 508 produces such a definition formula for setting this figure attribute as the display slot, and then sets the display slot to this display class. Then, based on the value used to refer to this display slot, the formula for updating the relevant display slot (namely, display slot to be updated which is defined by the display slot definition generating unit 503) is produced.

It should be noted that both the execution of setting the method and the slot into the function class and the display class, and the execution of the instance are handled by the object-oriented language processing system 302 in connection with the operations of the above-explained applicable graphic editor 303 and animation program editor 304.

Figure 2:
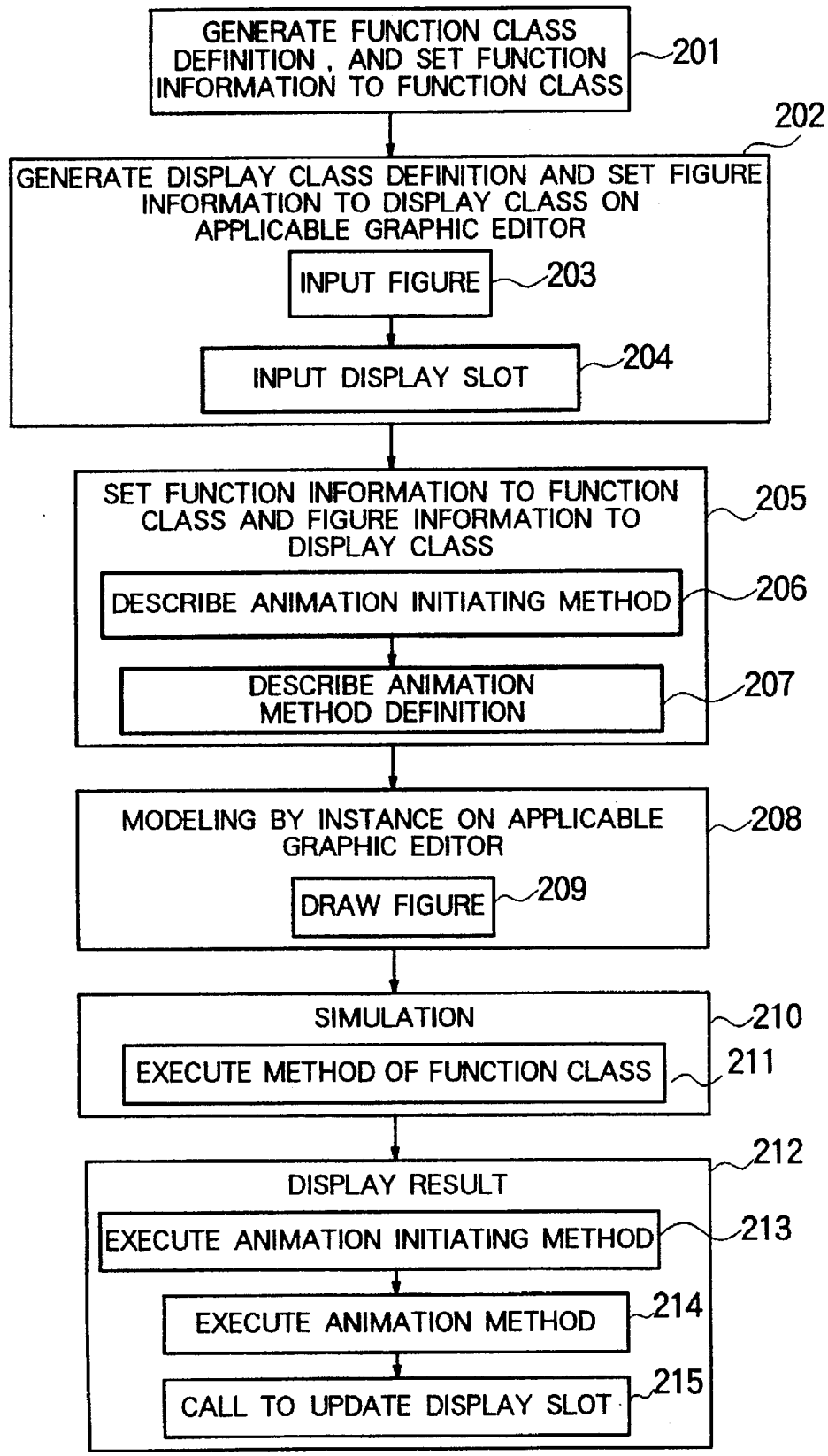
FIG. 2 is a flow chart for showing another design supporting sequence to be compared with the above-described embodiment.

Before explaining the sequential operation of this embodiment in accordance with the flow chart of FIG. 1, a description will now be made of a design supporting sequential operation in such a design supporting system without employing the animation program editor 304 with reference to FIG. 2 for the sake of comparison.

First, a component is defined as a class (will be referred to a "function class" hereinafter) by a program of an object-oriented language, and function information of this component is set to this function class(step 201). Next, a definition is made by the applicable graphic editor as to a class of a user figure (will be referred to a "display class" hereinafter), and figure (graphic) information is set to this display class (step 202).

In setting of the graphic information, the user figure is arbitrarily drawn by the user with a mouse and the like, and the resultant user figure is made in correspondence with the previously defined function class (step 203). As a result, the figure format is added to the above-described display class. Next, a designation is made of a display slot of the user figure by the operator (step 204). Then, the display slot definition format is added to the above-explained display class.

Subsequently, the animation program is defined by the object-oriented program, and is set to the function class and the display class (step 205). In setting of the animation program, the method definition to initiate the animation is first set to the above-explained function class (step 206). Then, the method for the animation is defined with using the above-described display slot and is set to the above-mentioned display class (step 207).

Next, a model input by an instance is performed with employment of the applicable graphic editor. The model input is carried out by drawing a figure indicative of the function class on the screen by the operator (step 209). As a consequence, an instance of a function class corresponding to the instance of the display class is produced.

Upon completion of the model to be designed, a simulation is carried out (step 210). The simulation is performed by executing the method of the function class (step 211). The result of this simulation is represented by executing the animation program (step 212). More specifically, the animation program is executed as follows:

First, the animation initiating method is executed (step 213), and the animation method is initiated and also executed (step 214). The display slot is updated by executing the animation method (step 215). As a result, the figure is modified in order to be fitted to a new slot value and the animation is carried out.

In such a sequence, to set the method for the animation, the operator must previously define the display slot which is used in the animation method. Also, a value to be set into this display slot, namely a value to be referred to must be checked and determined. For instance, when the attribute name of the relevant function class is wanted to be set into the display slot used in the animation method, this attribute name should be investigated to be set. A similar investigation is required to such a case that a reference is made of an argument of a method for cooperating with an animation, and display slot names of other figure attributes and the like. Such an investigation/setting work is cumbersome and complex, and therefore cannot be easily realized.

On the other hand, in accordance with the embodiment of the present invention, the animation method is generated as described hereinafter. As to a telephone as an example, the design supporting sequence 100 according to this embodiment will now be described in detail with reference mainly to FIG. 1.

At a first step 201 of FIG. 1, in response to an input from an operator, a function class definition 305 and a setting operation of function information with respect to a telephone are carried out on the object-oriented language processing system 302.

In FIG. 6, there is shown an example of describing a definition of a function class. A function class definition description 600 is constructed of a slot definition description 601 and a method definition description 602. This slot definition description 601 is to define such a function class titled as a "telephone". An "ID number", a "condition", a "telephone number", and a "connection line" are slot variables indicative of elements or attributes of a "telephone". Initial values are given to the respective slot variables and the method definition description 602 defines a method titled as "to dial". A method argument of this method is "object" and "tel-no".

FIG. 7A indicates a telephone function class 305 (on the memory 301 of FIG. 3) for storing these function class definition descriptions 600 entered by the operator. The telephone function class 305 is constructed of a slot definition group 700 representing a set of slot definition descriptions, and a method definition group 701 representing a set of method definition descriptions.

FIG. 7B shows an example of the slot definition 700 and FIG. 7C shows an example of the method definition 701. Specifically, when the telephone function class definition description 600 shown in FIG. 6 is entered, 702, 703, 704, 705, and 707 of FIGS. 7B and 7C are set. The above-described execution is realized by the object-oriented language processing system 302.

It should be noted that the "connection line" slot 705 among the slot definitions corresponds to the previously defined slot utilized to connect between instances, and the "figure" slot 706 corresponds to the pre-defined slot used to store an instance of the corresponding display class.

Referring back to FIG. 1, the description of the design supporting sequence according to the embodiment will now be continued.

A step 101 corresponds to a step for producing a display class definition 308 by the applicable graphic editor 303. In generating of the display class definition, an operator first initiates the applicable graphic editor 303 to input a figure corresponding to a function class (step 203). Then, the applicable graphic editor 303 sets a method for displaying this figure.

FIG. 8A schematically indicates an arrangement of the display class definition 308 generated on the memory 301 of FIG. 3. The display class definition 308 is constructed of a slot definition group 800 corresponding to a group of slot definition descriptions and a method definition group 801 corresponding to a group of method definition descriptions, similar to the function class definition 305 of FIG. 7A. FIG. 8B shows an example of a slot definition 800 of the display class definition 308. FIG. 9 schematically indicates an example of the method definition 801 of the display class definition 308.

Figure 11A:
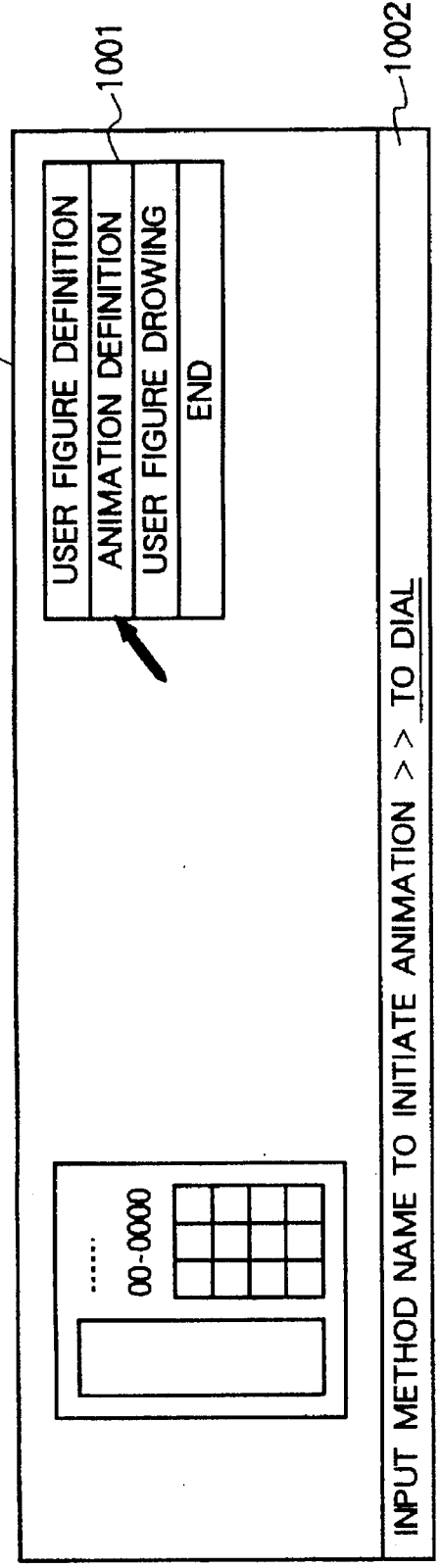
FIGS. 11A and 11B schematically represent an example of terminal screens when the sequence of FIG. 10 is executed.

It is now assumed that an operator generates, for instance, a figure of a telephone shown in 1902 of FIG. 11A by combining figure elements on the display, and designates it as a figure of a telephone function class. Accordingly, at the step 101, the display class definition 308 shown in FIG. 8B and FIG. 9 are stored in the memory 301 of FIG. 3. In other words, as the slot class definition group 800 of the display class, a "function" slot 802, an "px" slot 803, an "py" slot 804, and a "graphic" slot 808 are produced and then stored in the memory 301. Also, as the method definition group 801 of the display class, a "display" method 809, an "pn-args" method 830 and a "stef pn args" method 831 indicated in FIG. 9 are produced and then stored in the memory 301. The above-described executions are handled by the applicable graphic editor 303. Here, the "function" slot 802 among the slot definitions corresponds to the pre-defined slot utilized to store the instance of the corresponding function class. Both of the "px" slot 803 and the "py" slot 804 correspond to the pre-defined slot indicative of the display position for the figure. The "graphic" slot 808 is the pre-defined slot for seting the figure definition data. Also, the "display" method 809 among the method definition group 801 corresponds to the pre-defined method with such a procedure for representing itself with reference to the above-explained "graphic" slot 808. The "pn-args" method 830 corresponds to a defining method having a procedure for referring to display slots (text 1, text 2etc.) which are automatically produced by the system in order to define an animation method (will be described later). The "stef pn args" method 831 corresponds to such a method having a procedure for updating the display slot and redisplaying the figure.

Next, at the step 102 of FIG. 1, the animation program editor 304 is initiated to set the animation initiating method and the animation method. First, the animation initiating method definition is produced (step 103).

Figure 11B:
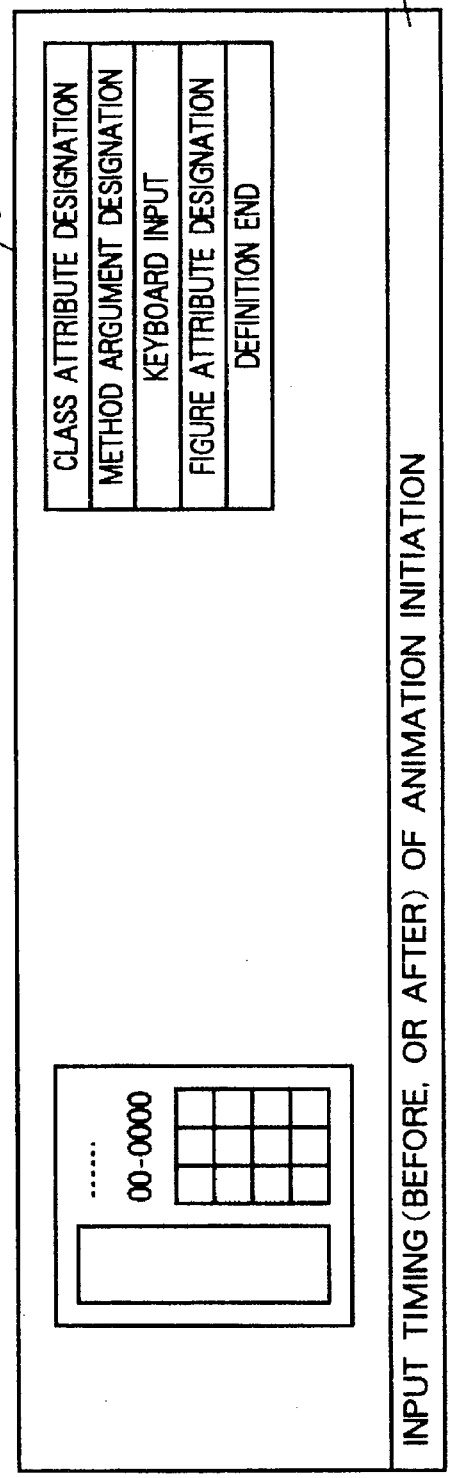

FIG. 10 is a flow chart for showing in detail the process 103 to generate and set the animation initiating method by the method and the timing designation operation. FIG. 11 shematically shows an example of a screen representation with regard to the process of FIG. 10. Referring now to FIG.

10 and FIG. 11, the process 103 to generate and set the animation initiating method definition by the method and the timing designation operation will be described more in detail.

First, a screen representation of the applicable graphic editor 303 is carried out by an operator (step 901). Next, the operator selects an animation definition menu 1001 from the displayed menu of the applicable graphic editor 303 (step 902). As a result, the animation program editor 304 is initiated. FIG. 11A represents such a condition that the animation definition menu 1001 has been selected. Then, the animation program editor represents a model 1902 of a telephone generated at the steps 201 and 101 of FIG. 1. A message is displayed by which an operator is required to enter the method name of the function class for initiating the animation. It is now assumed the operator inputs "to dial" 1002 of FIG. 11A as the method name to initiate the animation (step 903). Accordingly, the animation method definition generating unit 502 of the animation program editor 304 generates such an animation method name that is produced by adding "-display" to the entered method name (step 904). In this case, such an animation method name as "to dial-display" is generated.

Subsequently, at a step 905, the animation initiating method definition generating unit 501 is initiated and then such a message that requires the operator to enter timing of the animation initiation is displayed on the screen. With respect to the execution of the method "to dial" for the function class to initiate the animation, the operator selects and enters "before" when the animation initiation should be performed immediately before this method execution, or "after" when the animation initiation should be carried out after this method execution. As illustrated in 1003 of FIG. 11B, the operator selects "before" in this example. At the next step 906, the animation initiating method definition generating unit 501 generates an identifier on the basis of the entered timing. If the entered timing is "before", then such an identifier as ": before" is produced, whereas if the entered timing is "after", then such an identifier as ": after" is generated. Since the operator now inputs "before" 1003 at the step 905, the identifier ": before" is generated.

At the next step 907, the animation initiating method definition generating unit 501 retrieves a method definition formula of a function class based upon the method name inputted at the step 903 to acquire an argument definition. Since "to dial" has been entered as the method name, an argument definition 710 of FIG. 7C is acquired. Furthermore, a formula 709 for calling the method of the animation method name generated at the step 904 is produced (step 908). In this case, a formula 709 for calling such a method name "to dial-display" is generated. As the argument of this formula 709, the value of the "figure" slot for the function class and the like are employed. Then, such an animation initiating method definition 708 is generated that the designated method name is "to dial", the identifier is ": before" produced at the step 906, and furthermore the formula 709 produced at the step 908 is executed with having the argument acquired at the step 907 (step 909). The produced animation initiating method definition 708 is added, as illustrated in FIG. 7C, to the method definition group 700 of the function class definition 305 and is set (step 910).

The method to which the identifier ": before" produced in accordance with the above-explained manner has been added, is executed just before the method with no identifier based upon the object-oriented language CLOS. It should be noted that the execution to set to the function class is effected by the object-oriented language processing system 302.

With the above-explained process operations, both the defining operation and the setting operation for the animation initiating method of the step 103 shown in FIG. 1 are accomplished. Next, the generating operation and the setting operation for the animation method definition will be carried out (step 106).

Figure 12:
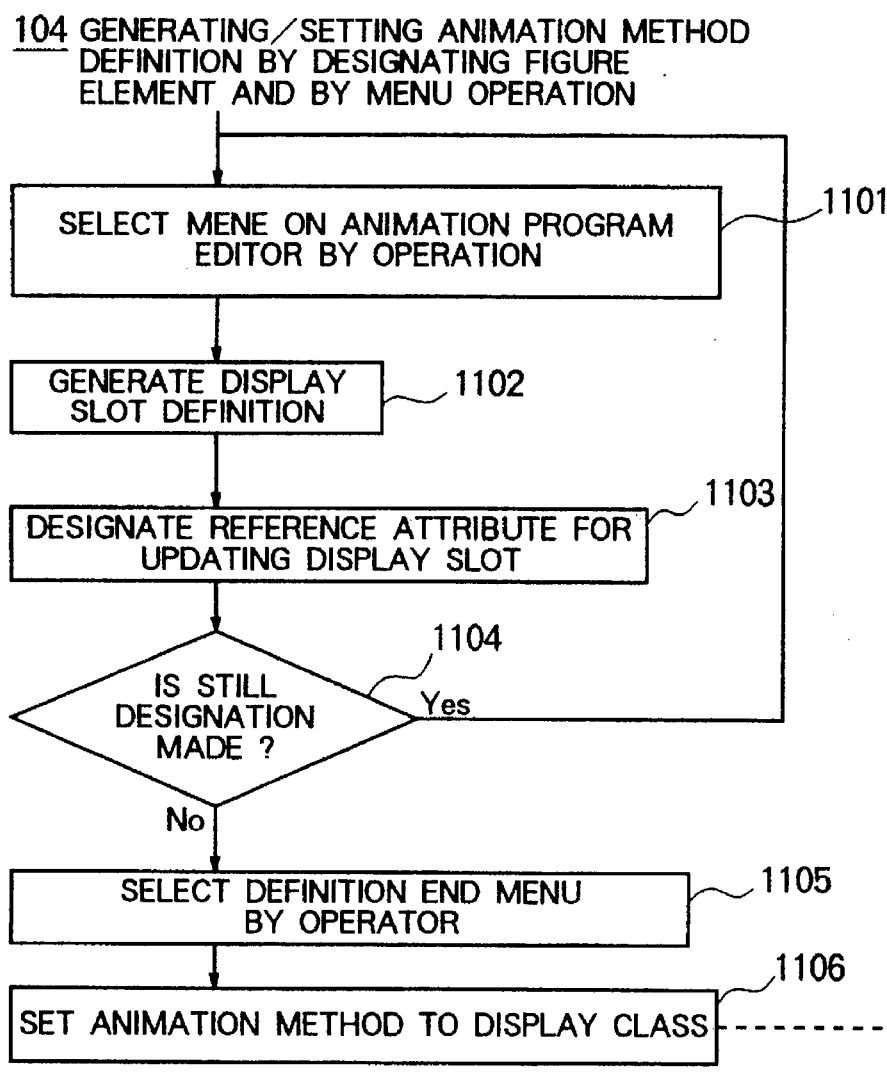
FIG. 12 is a flow chart for indicating a detailed sequence to produce and set an animation method definition by the figure element designation and the menu operation shown in FIG. 1.
Figure 13:
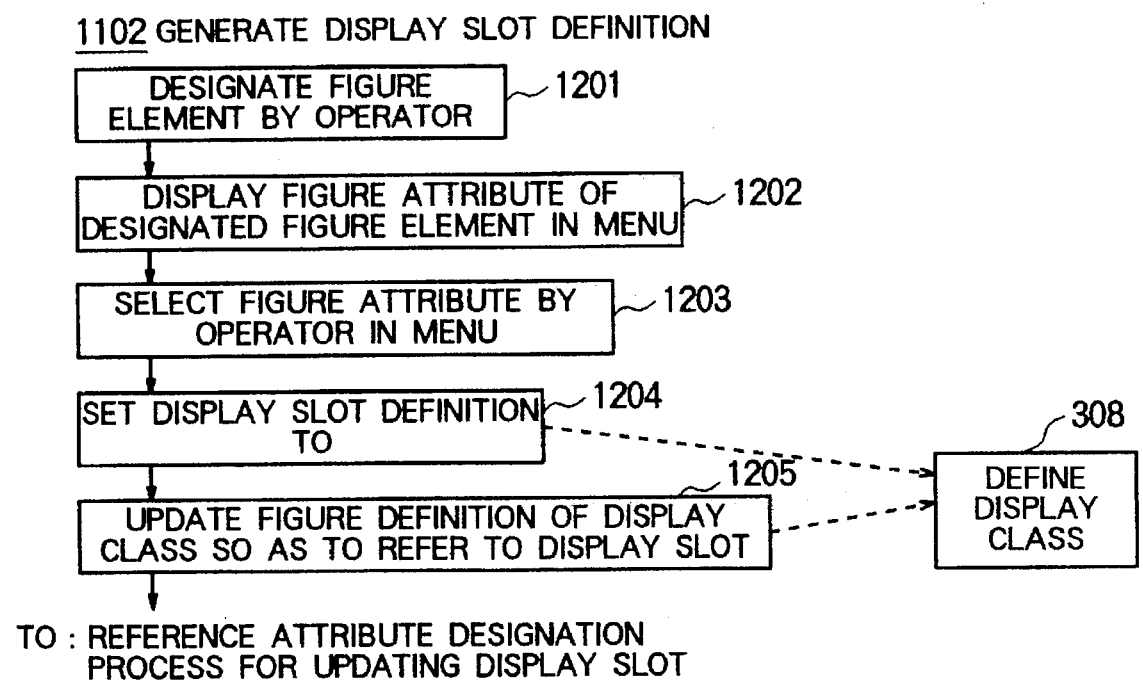
FIG. 13 is a flow chart for denoting a detailed sequence to produce the display slot definition shown in FIG. 1.
Figure 14:
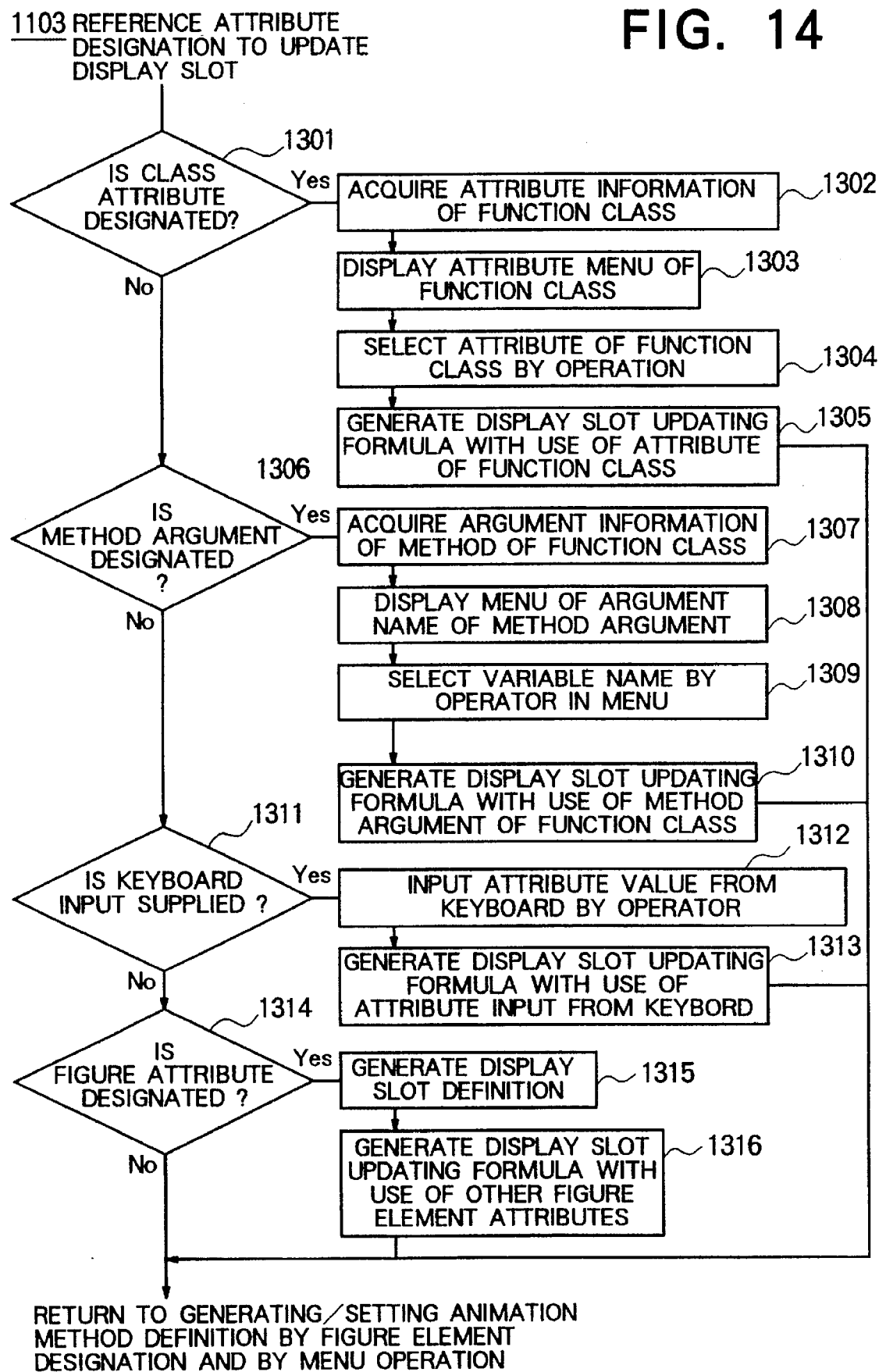
FIG. 14 is a flow chart for indicating a detailed sequence to designate a reference attribute for updating the display slot of FIG. 1.

FIG. 12 is a flow chart for explaining in detail the sequence 104 to generate and set the animation method definition by a figure element designation and a menu operation. FIG. 13 represents a detailed sequence to produce the display slot definition at a step 1102 of FIG. 12. FIG. 14 shows a detailed sequence to designate a reference attribute for updating the display slot at a step 1103 of FIG. 12.

Figure 15:
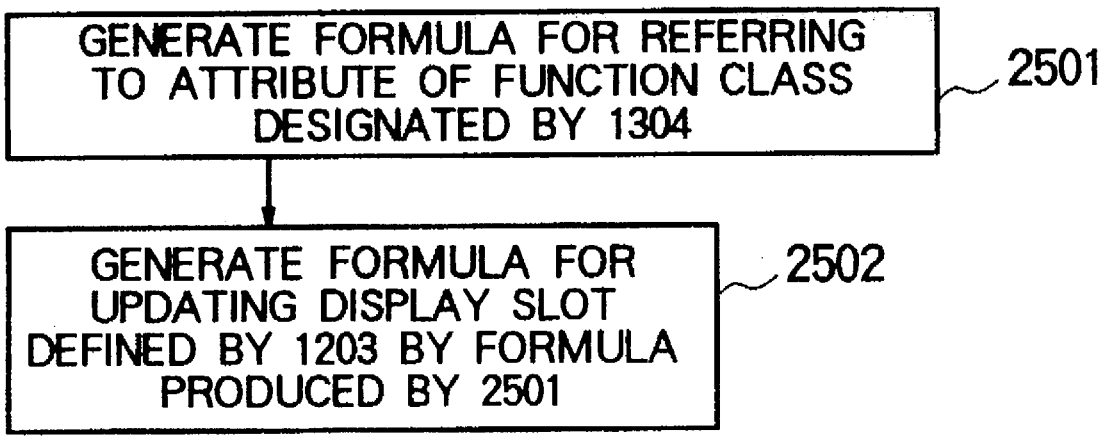
FIG. 15 is a flow chart for showing a detailed sequence to produce the display slot updating formula with employment of the attribute of the function class shown in FIG. 14.
Figure 16:
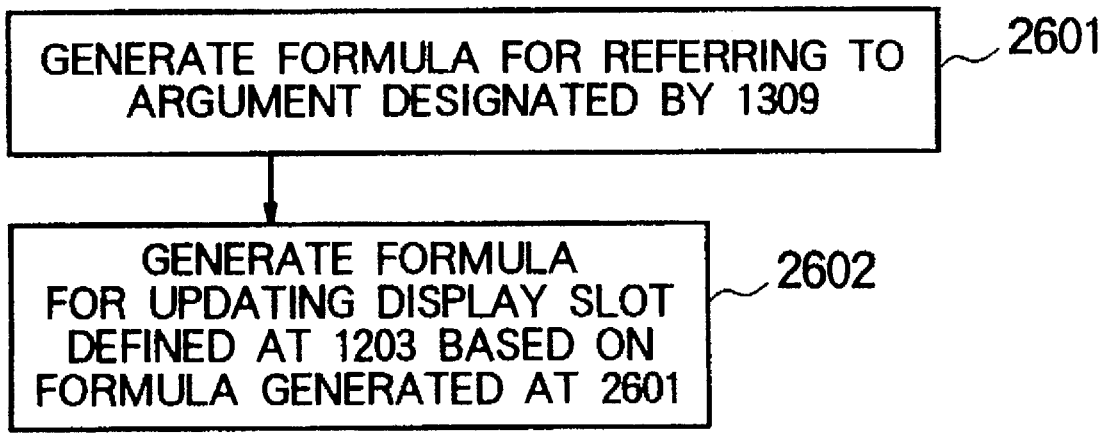
FIG. 16 is a flow chart for representing a detailed sequence to produce the display slot updating formula with employment of the method argument of the function class shown in FIG. 14.
Figure 17:
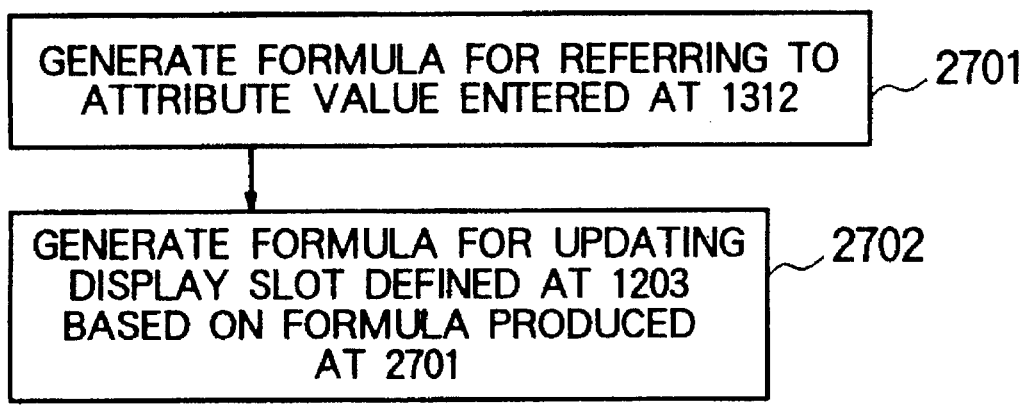
FIG. 17 is a flow chart for denoting a detailed sequence to produce the display slot updating formula with reference to the attribute entered from the keyboard shown in FIG. 14.
Figure 18:
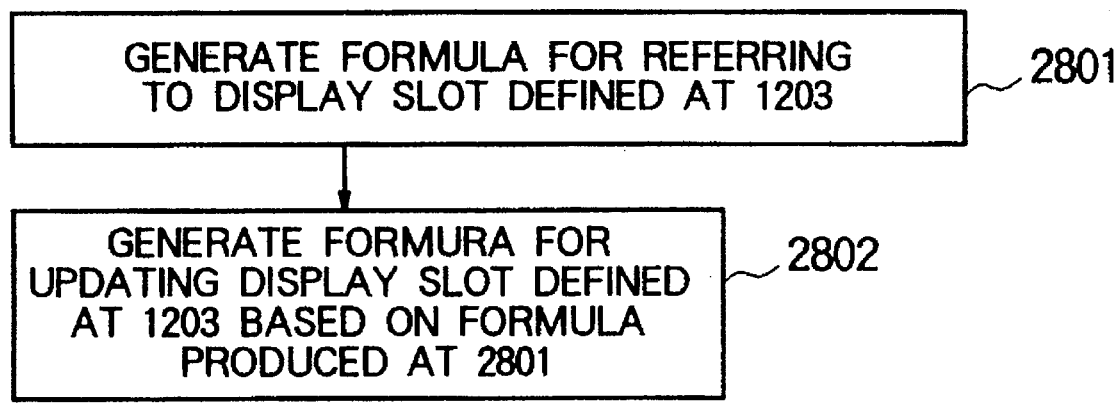
FIG. 18 is a flow chart for indicating a detailed sequence to produce the display slot updating formula with reference to another figure element attribute of FIG. 14.

FIG. 15 indicates a detailed sequence to generate a display slot updating formula with employment of an attribute of a function class at a step 1305 of FIG. 14. FIG. 16 shows a detailed sequence to generate a display slot updating formula with employment of a method argument of a function class at a step 1310 of FIG. 14. FIG. 17 denotes a detailed sequence to produce a display slot updating formula with employment of an attribute entered from the keyboard at a step 1313 of FIG. 14. FIG. 18 represents a detailed sequence to generate a display slot updating formula with employment of other figure element attributes at a step 1316 of FIG. 14.

FIG. 19 to FIG. 27 illustrate examples of display screens when the animation method definition is generated and set. Referring now to these figures, a description will be made of the sequence 104 to generate and set the animation method definition by the figure element designation and the menu operation.

First of all, the sequence to generate the display slot updating formula with employment of the attribute of the corresponding function class will now be explained.

At a step 1101 of FIG. 12, the operator first selects a menu on the animation program editor (step 1101). In this case, it is assumed that since the display slot updating formula with employment of the attribute of the corresponding function class is produced, the operator selects a "class attribute designation" menu 1401. FIG. 19A represents such a condition that the "class attribute designation" menu 1401 is selected on the screen.

Thereafter, the display slot definition generating operation is carried out (step 1102). Referring now to FIG. 13, the display slot definition generating operation will be described in detail. First, a message is made to request an operator to designate a figure element to be processed in an animation, and then the operator designates any of the figure elements from the user figures (step 1201). In FIG. 19A, such a message 1402 "designate figure element" is displayed, and the operator designates an upper character string 1403 of a telephone.

Next, a list menu concerning the figure attributes of the designated figure elements is displayed, and another message for requesting to select the figure attributes is displayed (step 1202). The operator selects any of the figure attributes from this list menu (step 1203). FIG. 19B indicates such a condition that a list menu related to the figure attributes of the character string 1403 designated at the step 1201, and a message 1404 "select attribute of figure element" is displayed. It is now assumed that the operator selects a "string" menu 1405.

As a result, the display slot definition generating unit 503 of the animation program editor 304 generates a new display slot name discriminatable from other display slot names in response to these inputs from the operator. Then, one display slot 805 of this new display slot name is added to the slot definition group 800 of the display class definition 308 (step 1204). As shown in FIG. 8C, this allocated display slot name is "text 1". As an initial value of this display slot, a value corresponding to the present representation. In this case, since such a character string 1403 as "- - -" of FIG. 19A has been designated at the step 1201, the initial value of the display slot "text 1" becomes "- - -"as indicated in 824 of FIG. 8C. Furthermore, the display slot definition generating unit 503 updates the description of this attribute about the figure definition function stored as the initial value of the "graphic" slot by the reference format to this display slot instead of the attribute value (step 1205). That is, in this example, a symbol "text 1" is added in the graphic slot 808 as shown in 811 of FIG. 8C, where slot names "px" and "py" have been registered as slots to be referred to (see FIG. 8B), to define an additional definition that the display slot "text 1" is further to be referred to. Also, the value of "string" is changed into "text 1" from the actually displayed value "- - -", as shown in 815 of FIG. 8C.

With the above-described sequence of FIG. 13, the display slot definition (step 1102) is complete.

Referring again to FIG. 12, process operations subsequent to a step 1103 will now be explained. When the display slot definition is accomplished at the step 1102, the display updating formula generating unit 504 is initiated, and a designation is made of an attribute which is referred to so as to update the display slot (step 1103). Then, a display slot updating formula is produced.

Referring now to FIG. 14, the sequence 1103 to designate reference attributes for updating display slots will be explained in detail. First, the display updating formula generating unit 504 judges as to whether or not a class attribute designation is made (step 1301). Since in this case, it is described that the class attribute designation is made, the display updating formula generating unit 505 by the attribute of the function class among 505 to 508 is initiated, and then the process operation is advanced to a step 1302. Then, the display updating formula generating unit 505 acquires the attribute information of this class from the corresponding function class definition (step 1302), and such a message for requesting the operator to select both the attribute list menu and the attribute is displayed (step 1303).

Figure 20:
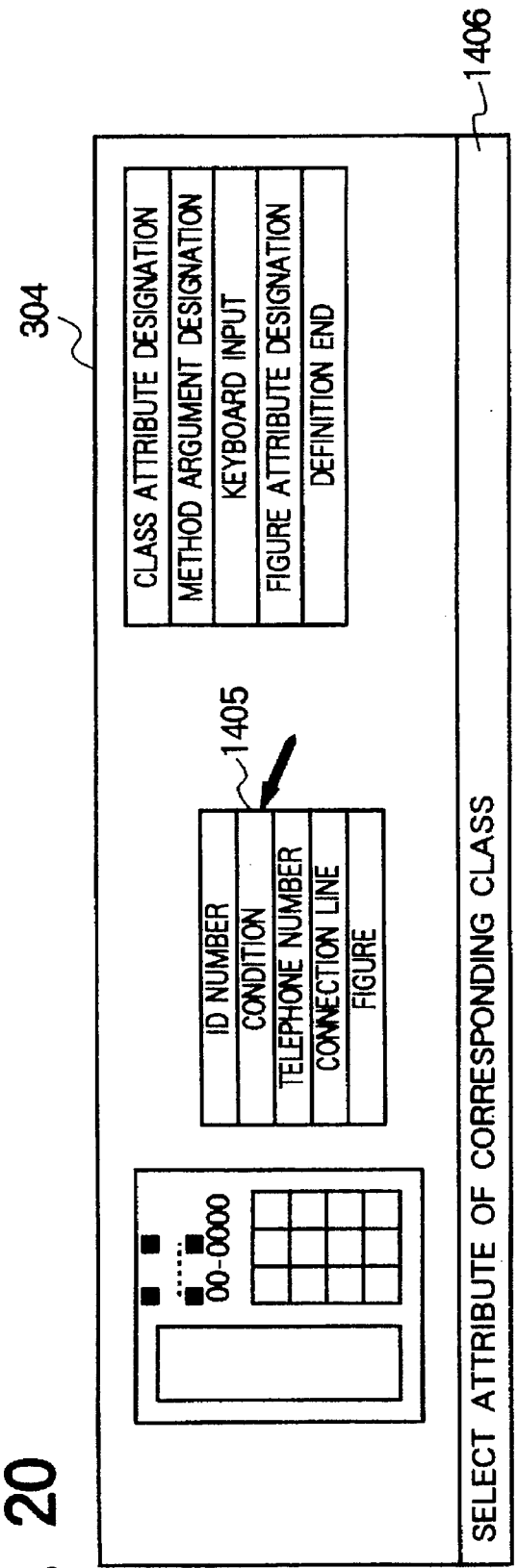

FIG. 20 indicates such a condition that a message 1406 is displayed so as to request the operator to select the attribute list menu and the attribute. The operator selects any of these attributes from the attribute list (step 1304). In this case, a "condition" menu 1407 is selected. As a consequence, the display updating formula generating unit 505 at the step 1305 produces a formula to update such a display slot as "text 1" previously defined by the attribute value ("condition") designated by the corresponding function class. As a consequence, a display slot updating formula 819 of FIG. 9 is generated.

As indicated in FIG. 15, the generating operation of the display slot updating formula 819 at the step 1305 contains a step 2501 and a step 2502. First, at the step 2501, a formula 840 (FIG. 9) for referring to the attribute of the function class designated at the step 1304 is generated. Next, at the step 2502, another formula 819 for updating the display slot defined at the step 1204 based on this formula 840 is produced. As a consequence, the display slot updating formula with employment of the attribute of the function class is generated.

Subsequently, a detailed description will now be made of a sequence to generate the display slot updating formula by the method argument of the function class.

It is now assumed at the step 1101 of FIG. 12 that the operator selects menu of "method argument designation". FIG. 21A represents such a state that the "method argument designation" menu 1501 is selected on the screen. Similar to the previous description with reference to FIG. 13, the display slot definition generating unit 503 additionally defines the display slot to the slot definition group 800 of the display class definition 308 at the step 1102. Assuming now that as illustrated in FIG. 21A, the character string 1502 in the telephone functioning as the user figure is designated by the operator, and furthermore a figure attribute "string" 1405 thereof is selected as FIG. 21B. Then, the display slot definition generating unit 503 automatically allocates a new name such as "text 2" to the display slot which is again added, and further additionally defines this "text 2" to the slot definition group 800 as illustrated in 806 of FIG. 8C. As shown in 825, an initial value of this display slot is "00-0000". Furthermore, a symbol "text 2" shown in 812 as a description of display slots to be referred to among the "graphic" slot 808 is added, and the actually drawn value of "00-0000" as the value of the keyword: string of the corresponding character string figure is changed into the symbol "text 2". As described above, the figure definition of the "graphic" slot is changed into the reference format to the added display slot.

After such a display slot definition, a designation is made of an attribute referred to so as to update this display slot (step 1103). Then, the display slot updating formula is produced. Referring to FIG. 14, the sequence 1103 to designate a reference attribute for updating a display slot will now be explained in detail. First, a judgement is carried out as to whether or not the class attribute designation is made (step 1301), and another judgement is made as to whether or not the method argument designation is performed (step 1306). In this case, the method argument designation is performed, so that the process operation is advanced from the step 1301 to the step 1306. At this step 1306, the display slot updating formula generating unit 506 by the method argument of the function class is selected and initiated, and thereafter the process operation is advanced to a step 1307. At the step 1307, the display slot updating formula generating unit 506 acquires the argument information from the method definition of the function class. Moreover, the display slot updating formula generating unit 506 displays list menu about variable names of the method argument at the step 1308, and requests the user to select it.

In FIG. 22, there is represented such a message 1503 for requesting the operator to select the list menu about the variable names of the method arguments, and the argument variable name. The operator selects any of these variable names listed in the menu about the argument variable names (step 1309). In this case, menu 1504 of "tel-no" is selected. As a result, the display slot updating formula generating unit 506 produces a formula at a step 1310, by which the display slot "text 2" previously defined by the value to refer to the designated argument "tel-no" is updated. As a consequence, a display slot updating formula 820 of FIG. 9 is produced.

In detail, the generating operation of the display slot updating formula 820 at the step 1310 is constructed of two stages, i.e., a step 2601 and a step 2602 as shown in FIG. 16. At the step 2601, the formula 841 (FIG. 9) for referring to the argument designated at the step 1309 is produced. At the step 2602, the formula 820 to update the display slot previously defined at the step 1204 based on this formula 841 is produced. As a result, the display slot updating formula with employment of the method argument of the function class is generated.

Then, a detailed description will now be made of the sequence to generate the display slot updating formula by the attribute value inputted from the keyboard.

Figure 23A:
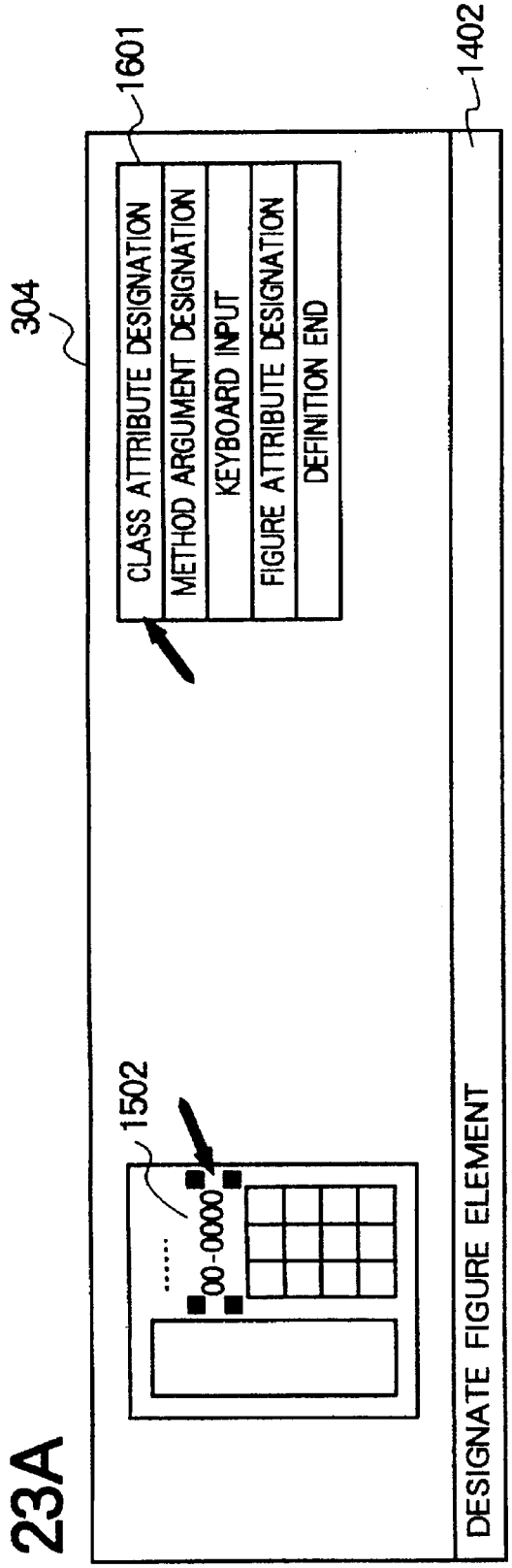
FIGS. 23A, 23B and FIG. 24 schematically show terminal screen display examples when the display slot updating formulae are produced based on the respective attribute values entered from the keyboard.
Figure 23B:
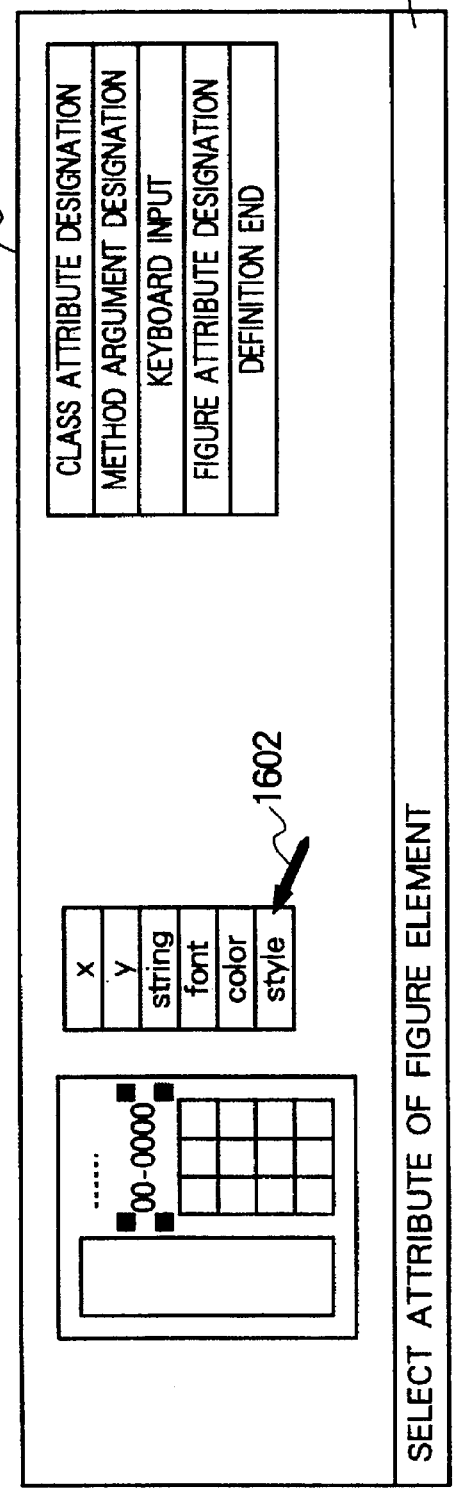

It is now assumed at the step 1101 of FIG. 12 that the operator selects menu of "keyboard input". In FIG. 23A, there is shown such a condition that menu 1601 of "keyboard input" is selected on the display screen. Similar to the sequence to generate the above-described display slot updating formula, an additional definition of a display slot is carried out at a step 1102 in accordance with the sequence shown in FIG. 13. In this case, as illustrated in FIG. 23A, a character string 1502 in a telephone corresponding to the user figure is designated by the operator, and furthermore, as shown in FIG. 23B, a figure attribute "style" 1602 is selected. Thus, the display slot definition generating unit 503 allocates such a new name as "text 3" to the display slot to be added, and then additionally defines this display slot such as "text 3" to the slot definition group 800 of the display class as shown in 807 of FIG. 8C. As represented in 826, an initial value of this slot is ": normal". In addition, a symbol "text 3" indicated in 813 is added to the description of the display slots to be referred among the "graphic" slot 808, and the actually drawn value of ": normal" is changed into a symbol "text 3" such as 818 as the value of the keyboard: style for drawing the character string.

Figure 24:
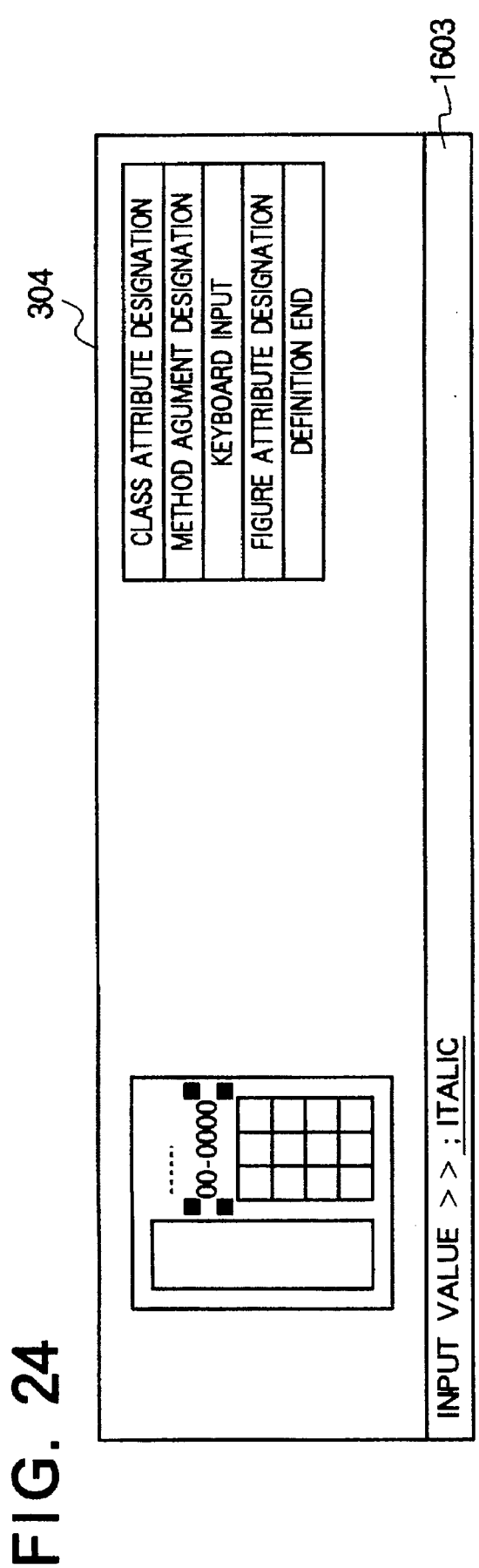

After executing such a definition of the display slot, a designation is made of an attribute for referring to the updating operation of this display slot (step 1103). Then, the display slot updating formula is generated. Referring now to FIG. 14, the sequence 1103 to designate the reference attribute for updating the display slot will be explained in detail. A check is done as to whether or not a class attribute designation is made (step 1301), a judgement is made as to whether or not a method argument designation is carried out (step 1306), and also another check is done as to whether or not a designation is made of a keyboard input (step 1311). At this time, it is described such a case that the designation is made of the keyboard input. Therefore, the process operation is advanced via steps 1301 and 1306 to the step 1311 at which a selection is made of the display slot updating formula generating unit 507 by the attribute value entered from the keyboard. Then, the process operation is advanced to a step 1312. At this step 1312, the updating formula generating unit 507 displays such a message to request the operator to input the value into the selected attribute, and then the operator enters an arbitrary value. FIG. 24 represents such a condition that a message 1603 for requesting to input the value is displayed, and the operator enters ": italic" from the keyboard. Subsequently, at a step 1313, a formula to update the previously defined display slot "text 3" based on the inputted value ": italic" is generated. As a consequence, the display slot updating formula 821 as shown in FIG. 9 is generated.

Precisely speaking, the generating operation of the display slot updating formula 821 at the step 1313 is constructed of two stages, i.e., a step 2701 and a step 2702 as shown in FIG. 17. At the step 2701, the formula 842 (FIG. 9) for referring to the attribute value inputted at the step 1312 is produced. At the step 2702, the formula 821 to update the display slot previously defined at the step 1204 based on this formula 842 is produced. As a result, the display slot updating formula with employment of the attribute entered from the keyboard is generated.

Figure 25A:
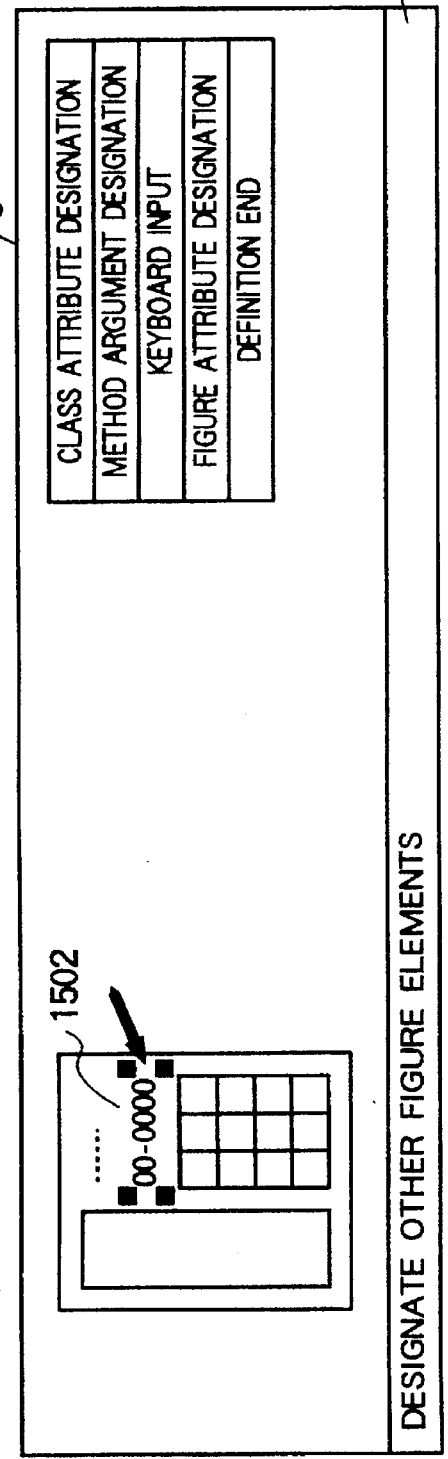
FIGS. 25A, 25B and FIGS. 26A and 26B schematically show terminal screen display examples when the display slot updating formulae are produced based on the respective figure attributes of other figure elements.
Figure 25B:
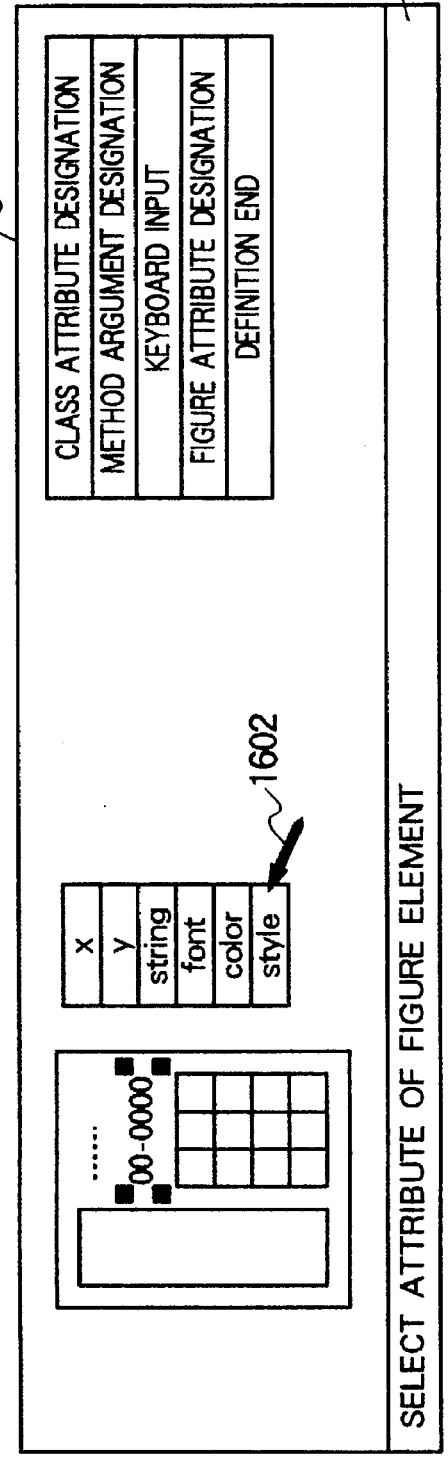

Next, a detailed description will now be made of the process operation to produce the display slot updating formula by the figure attributes of other figure elements. Assuming now at the step 1101 that the operator selects menu of "figure attribute designation". FIG. 25A represents such a situation that the "figure attribute designation" menu 1701 is selected on the display screen. Subsequently, similar to the previously described three different selections, the additional definition to the slot definition group 800 of the display class definition is performed in accordance with the sequence of FIG. 13 at the step 1102. In other words, it is assumed that as indicated in FIG. 25A, the operator designates a character string 1403 in a telephone corresponding to the user figure as shown in FIG. 25A, and further the operator selects a figure attribute "style" 1602 thereof as illustrated in FIG. 25B. Then, the display slot definition generating unit 503 additionally designates a display slot 823 having such a new name of "text 4" to the slot definition group 800 of the display class definition. An initial value of this slot is ": normal" as illustrated by 827 of FIG. 8C. Furthermore, a symbol "text 4" shown in 814 of FIG. 8C is added to the description of the display slots to be referred to among the "graphic" slot 808, and the actually drawn value of ": normal" is changed into a symbol "text 4" 816 as the value of the keyword: style of the character string.

Figure 26A:
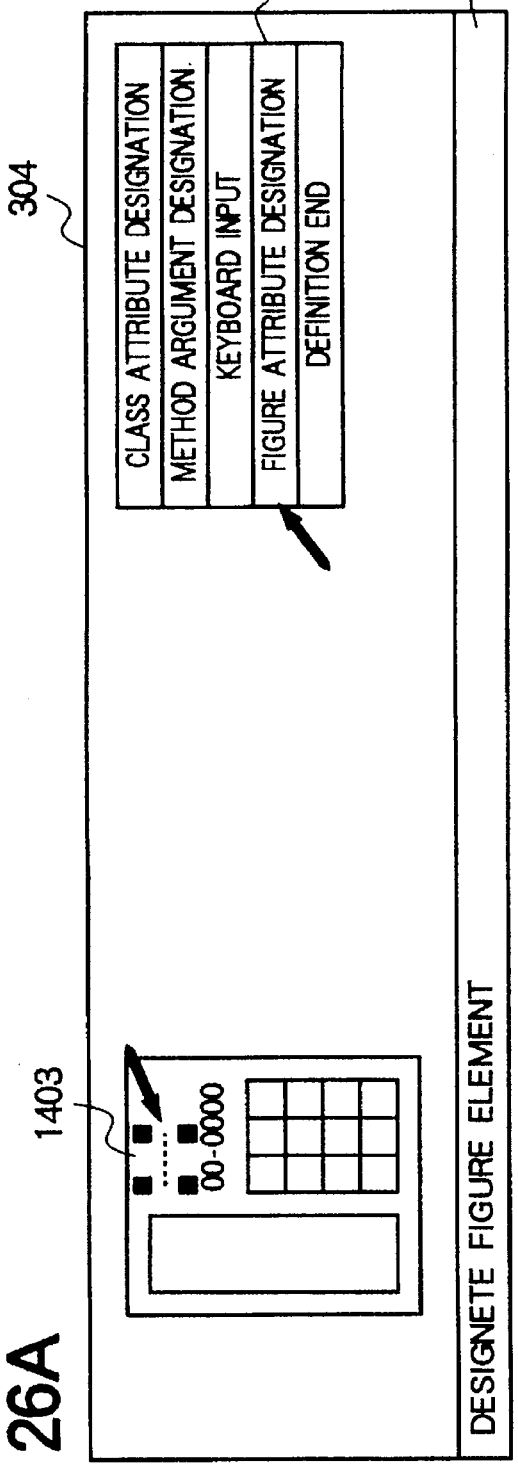

After the execution of such a display slot definition, a designation of the attribute is performed in accordance with the sequence of FIG. 14 at a step 1103, which is referred to so as to update such display slot. Here, a description is made of such a case that the figure attribute designation is performed. Therefore, the process operation is advanced via steps 1301, 1306, 1311 to a step 1314 at which the display slot updating formula generating unit 508 by the figure attributes of other figure elements shown in FIG. 5 is selected. Then, the process operation is advanced to a step 1315. At this step 1315, the display slot definition generating operation is carried out. This implies that as to other figure elements for referring to the attribute, the display slot is defined. Concretely speaking, this process operation is the same as that of FIG. 13. That is, the display slot updating formula generating unit 508 first displays such a message for requesting the operator to designate other figure elements for referring to the attribute. The operator designates any of these figure elements (step 1201). FIG. 26A represents such a state that a message 1702 for requesting the operator to designate other figure elements is displayed, and then the operator designates the character string 1502.

Figure 26B:
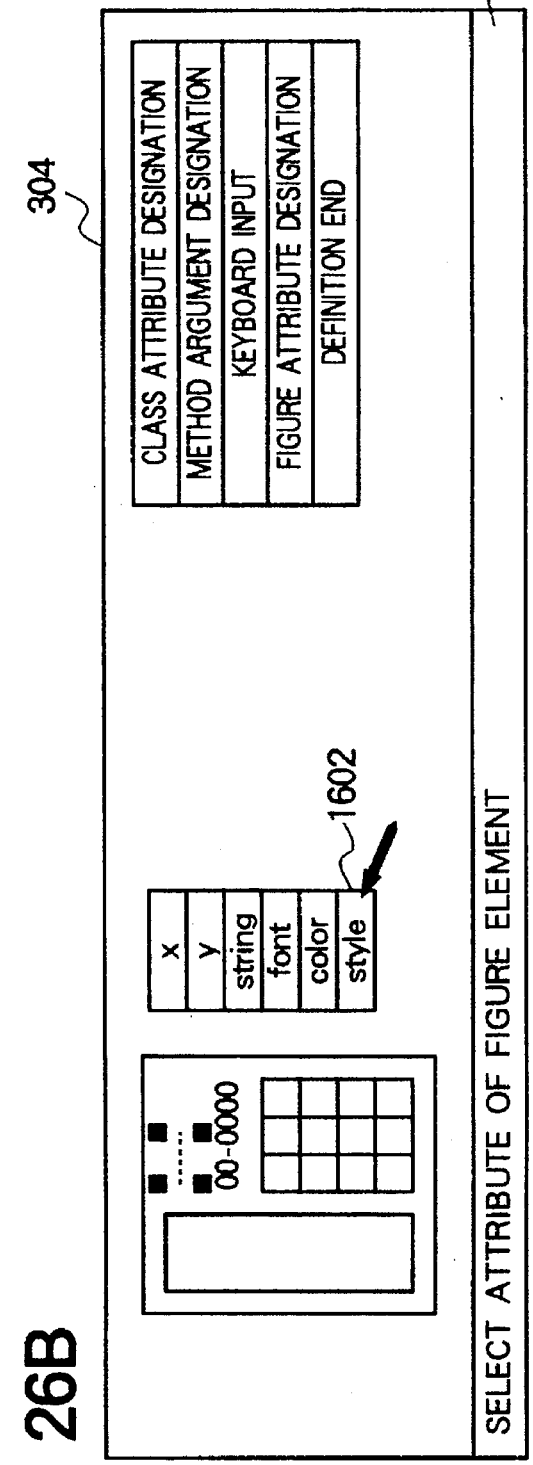

Next, list menu about the figure attributes of the designated figure elements is indicated, and also, a message for requesting the operator to select the figure attribute is displayed (step 1202). The operator selects any of these figure attributes from this list menu (step 1203). In FIG. 26B, there is shown such a condition that the list menu about the figure attribute of the character string 1502 designated at the step 1201 is represented, and such a message "select attribute of figure element" is displayed. At this time, it is assumed that the operator selects "style" menu 1602.

Next, the display slot definition information about an arbitrary name is set to the display class definition 308 (step 1204), and the figure definition of the display class for referring to this display slot is changed (step 1205). At this time, since the display slot definition has been made, the defined display slot "text 3" is used.

When the display slot of other figure elements for referring to the attribute has been acquired at the step 1315 of FIG. 14 in accordance with the above-described manner, the process operation is advanced to the subsequent step 1316 at which a formula for updating the previously defined display slot "text 4" based on this designated figure attribute value ("style" of "text 3") is generated. Accordingly, a display slot updating formula 822 of FIG. 9 is produced. FIG. 18 represents a detailed content of the step 1316. First, at a step 2801, a formula 843 (FIG. 9) used for referring to the designated figure attribute value is generated. Thereafter, at a step 2802, the formula 822 for updating the previously defined display slot based on this formula 843 is produced. In this case, "text 4" 823 is updated with reference to the display slot "text 3" 807.

Figure 27A:
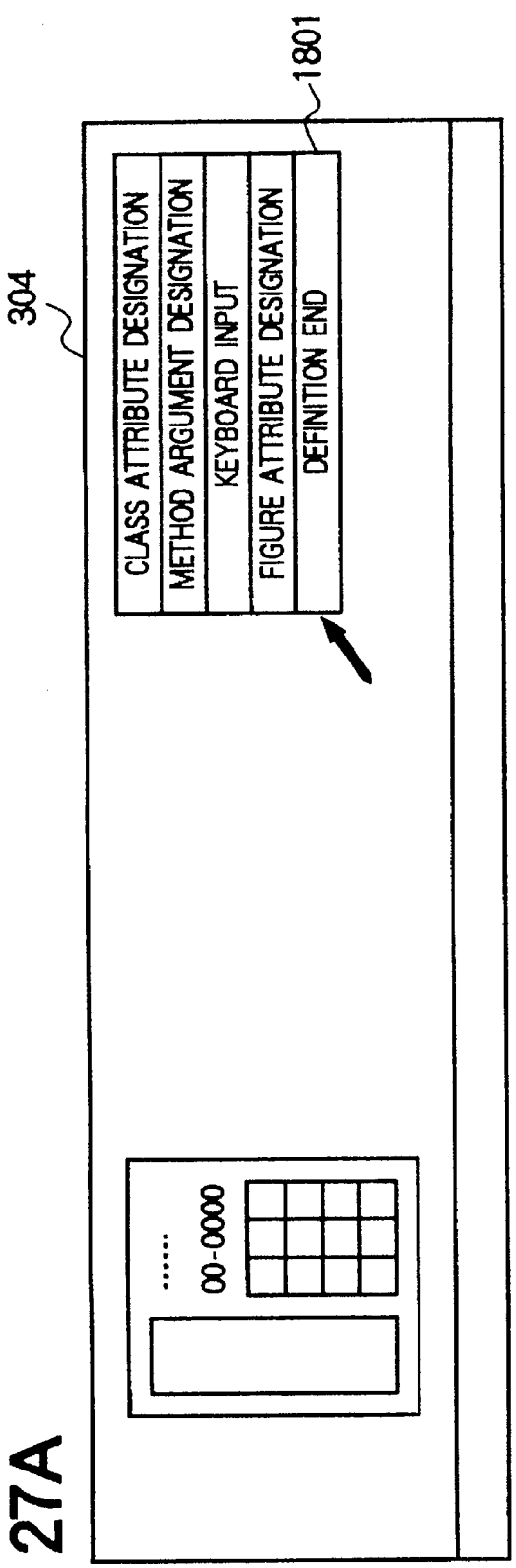
FIGS. 27A and 27B schematically represent terminal screen display examples when the definition ending designations are made.

As previously explained, both the display slot definition and the display slot updating formula are produced by repeating the sequence indicated from the step 1101 to the step 1104 in FIG. 12. Finally, the operator selects menu "definition end" (step 1105). FIG. 27A shows such a state that the "definition end" menu 1801 is selected. Upon selection of the "definition end" menu, the animation method definition of the name which has been previously generated at the step 904 of FIG. 10 could be confirmed. Accordingly, the animation method definition generating unit 502 adds this animation method definition to the display class definition 308 and the method definition group 800 so as to be set therein (step 1106). In this case, as illustrated by 810 of FIG. 9, such an animation method named as "to dial-display" and having four sorts of display slot updating formulae 819, 820, 821, 822 is set.

Figure 27B:
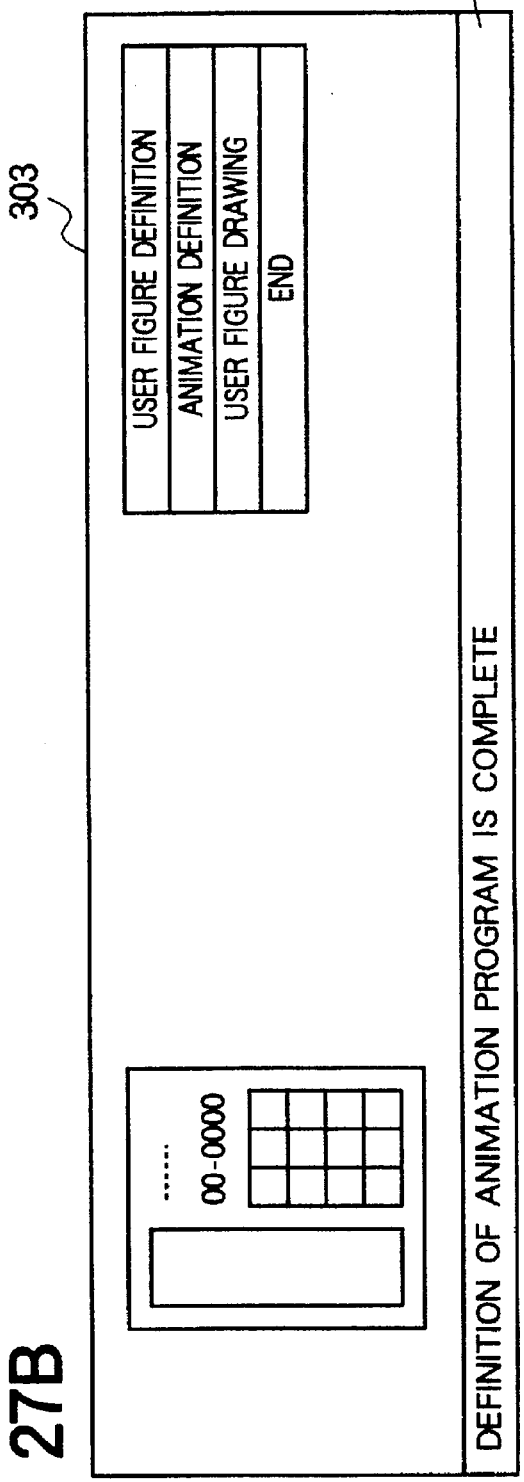

Then, the animation program definition by the animation program by the animation program editor is accomplished, and a message 1802 is represented as in FIG. 27B. It should be understood that the setting operation to the display class is executed by the object-oriented language processing system 302.

With the above-described process operations, the setting operations of the animation initiating method and the animation method defined at the step 102 of FIG. 1 have been ended.

Referring again to FIG. 1, the description of the design supporting sequence according to the embodiment is continued. At a step 208 subsequent to the step 102, modeling by an instance is carried out with employment of the applicable graphic editor. In this modeling, a figure or graphic is generated on the applicable graphic editor 308, and a "display" method 809 is called to draw the figure (step 209).

Furthermore, an instance of the corresponding function class is generated. The production of the instance is executed by calling the object-oriented language processing system 302. Also, a coupling process defined by a user is performed to set a linkage between instances. Several instances are generated over several classes by repeating the drawing process and the coupling process.

Next, a simulation is carried out (step 210). The simulation is performed by initiating the method of the function class by the operator (step 211). For instance, the method "to dial" of FIG. 7C is initiated with respect to the instance of the telephone function class. In the method "to dial", both himself "object" and a telephone number "tel-no" are employed as arguments, a method "to transmit" is performed. In this method "to transmit" (not shown), the telephone number is used as the argument to other components connected to this telephone, and a method "to receive" is executed. Thus, the telephone number is propagated and the simulation can be continued. It should be noted that the method for such a function class is executed by the object-oriented language processing system 302.

Next, a result display is performed (step 212). The method of the function class is arbitrarily executed by the simulation at the step 210. When the animation initiating method has been defined as the preprocessing operation, or the postprocessing operation of the method of this function class, the animation initiating method thereof is performed in this result display, and the animation program is initiated (step 213).

Figure 28:
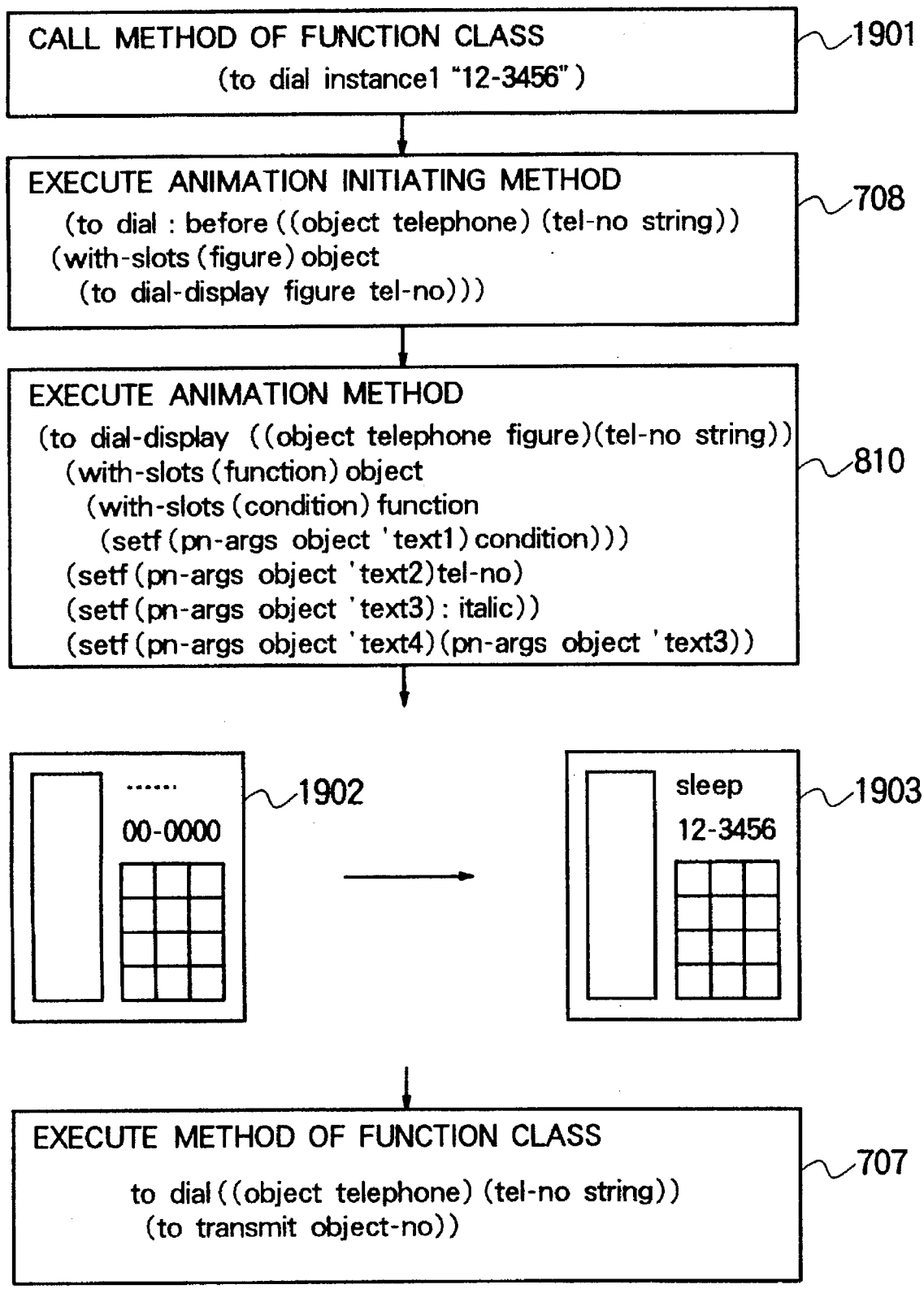
FIG. 28 schematically shows initiating operation of the animation program.

FIG. 28 is an explanatory diagram for representing operation of the animation program initiation. Assuming now that a call is made of a method "to dial" in the function class of the telephone (step 1901), a method "to dial: before" 708 of the animation initiating method is initiated (step 213 of FIG. 1). In this method "to dial: before" 708, a method "to dial-display" 810 of the telephone figure class is called (step 214 of FIG. 1).

As previously explained, since the produced display slot updating formulae have been set in the method "to dial-display" 810 of the telephone figure class, these updating formulae are called to update the display slots (step 215).

First of all, in the method "to dial-display" 810, a "text 1" display slot 805 is updated based upon a value "sleep" of a "condition" slot of the instance of the corresponding function class. A "text 2" display slot 806 is updated by a telephone number "12-3456" of an argument for the method "to dial-display" 810. Furthermore, a "text 3" display slot 807 is updated by a constant ": italic". Also, a "text 4" display slot 823 is updated by using the value of the "text 3" display slot 807.

With the above-described update of the display slots, as illustrated in FIG. 28, a telephone figure 1902 displayed on the screen is modified into another telephone FIG. 1903. Concretely speaking, a portion "- - -" of the telephone FIG. 1902 becomes an italic character "sleep" in the telephone FIG. 1903, and a portion "00-0000" of the telephone FIG. 1902 becomes an italic number "12-3456" in the telephone FIG. 1903. As described above, results of the simulation is displayed as the animation. It should be noted that the control of method executions such as the display slot access and the updating operation of the display slot value are handled by the object-oriented language processing system 302.

In accordance with the above-described embodiment, designations are made of the method for the function class to initiate the animation, the timing of initiation, and the figure element on the animation program editor. Furthermore, the attribute of this figure element and the value to update this attribute are selectively operated in the interactive manner. As a consequence, both the animation initiating method for performing the animation in cooperation with the method of the simulation, and also the animation method for modifying the user figure by the attribute value of the corresponding function class, the argument value of the cooperative method, and other figure attitude values can be automatically produced.

Also, the produced animation initiating method and the generated animation method are stored in the function class and the display class, respectively, so that they may be employed to display the results of the simulation. As a consequence, the simulation result display method for the object-oriented type design support could be readily generated, expanded, and modified.

Figure 29:
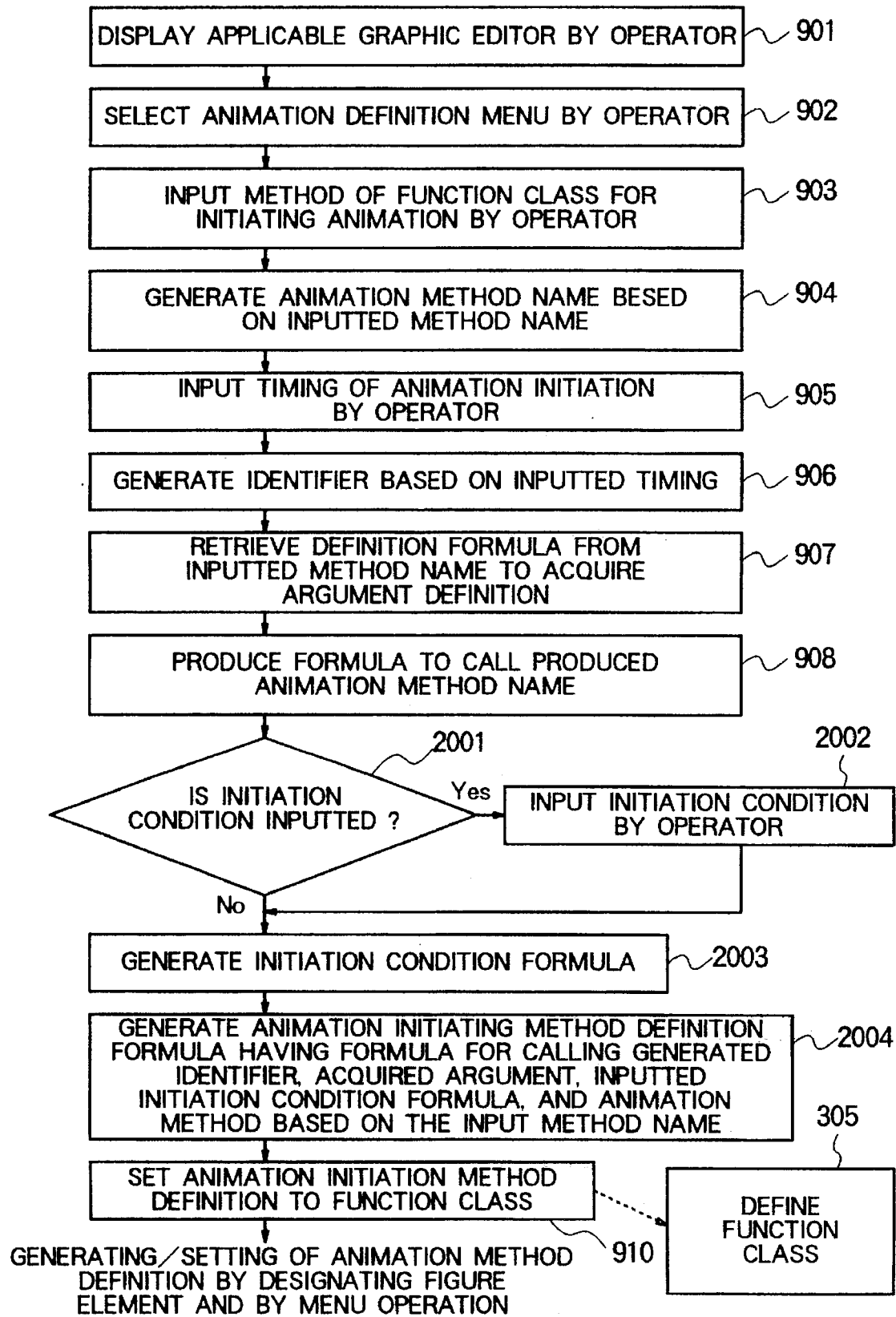
FIG. 29 is a flow chart for indicating a sequence to produce and set another animation initiating method definition formula according to another embodiment of the present invention.

FIG. 29 indicates a sequence to generate and set such an animation initiating method definition form. Since steps 901 to 908 are identical to those of FIG. 10, descriptions thereof are omitted. In FIG. 29, after a formula to call the animation method has been generated (step 908), a check is done as to whether or not the initiation condition is entered (step 2001). When the initiation condition is entered, this initiation condition is inputted by the operator (step 2002).

Next, an initiation condition formula is produced (step 2003). Then, such an animation initiating method defining formula is produced which owns the method name entered at the step 903, the identifier produced at the step 906, and further the argument acquired at the step 907, and also has the initiation condition formula and the animation method generated at the steps 2003 and 908 (step 2004). Thus, the generated animation initiating formula is set as a method definition of the function class definition 305 (step 910).

With the above-described process operations, the animation initiating method defining formula containing the initiating condition formula is produced and set, and the execution of the animation may be restricted under the predetermined condition.

Figure 30:
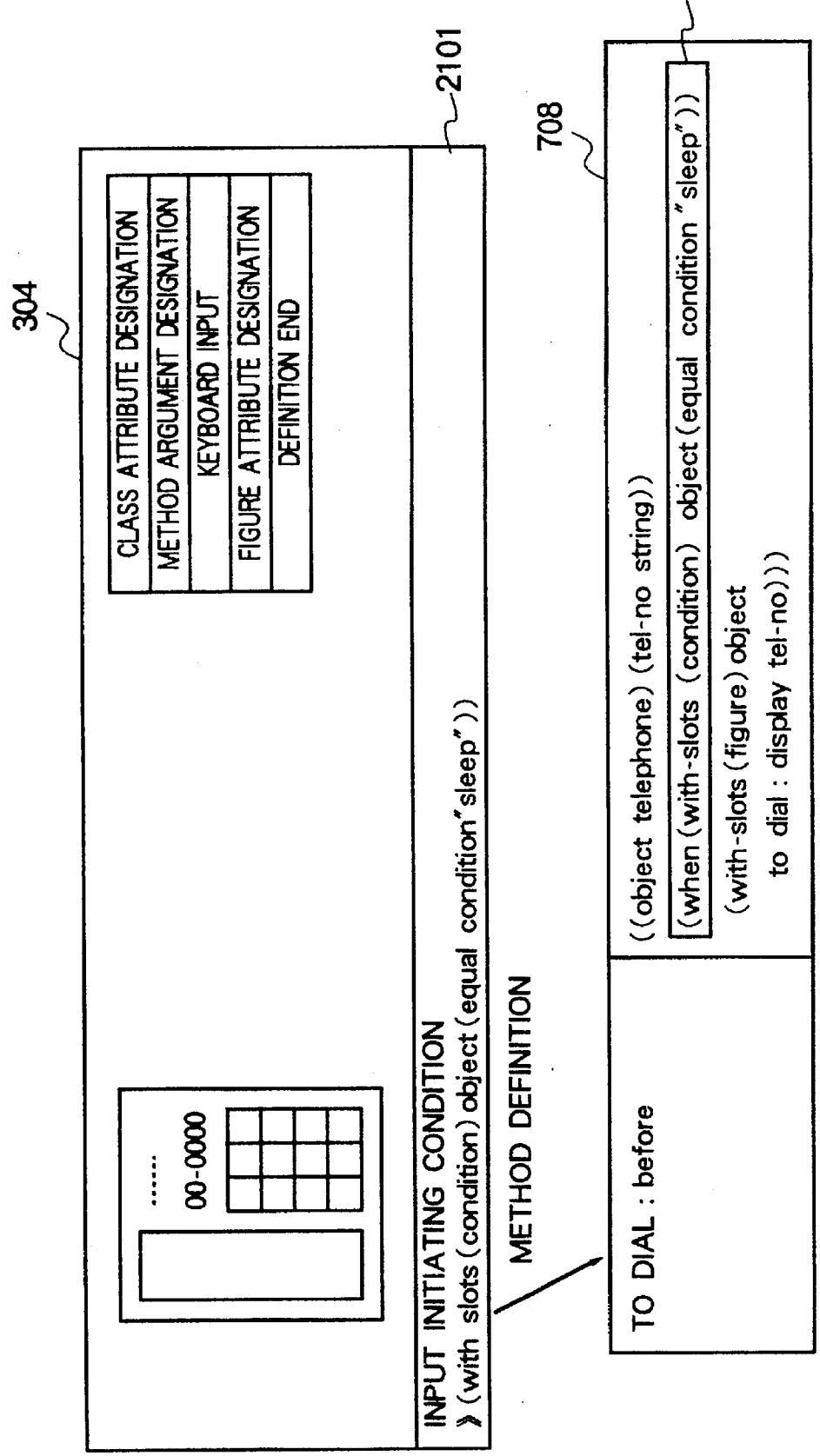
FIG. 30 schematically shows examples of a terminal screen and a method definition with regard to the sequence of FIG. 29.

FIG. 30 illustrates an example of a screen when the initiation condition is inputted at the step 2002, and another example of the produced method definition. In this case, such an animation initiating condition 2101 that if the value of the "condition" slot is "sleep", then the animation is initiated, is inputted. Then, at a step 2003, an initiation condition formula 2102 for judging whether or not the animation method is called under this condition is produced. Further, at a step 2004, a method definition 708 containing this formula 2102 is produced. Then, the produced method definition 708 is set to its function class definition 305 at a step 910.

Since the animation initiating method definition formula containing the initiation condition is generated and set in the above-described manner, only the necessary simulation result among the simulation results can be displayed, so that the high-speed simulation can be realized.

In the above-described embodiment, the user figure is modified with reference to such values as the attribute value of the corresponding function class and the argument value of the cooperative method, so that the animation is realized. Alternatively, these reference values are not always utilized. In other words, these numeral values may be converted into another character string, or one character string may be converted into another character string with employment of an arbitrary conversion table.

Figure 31:
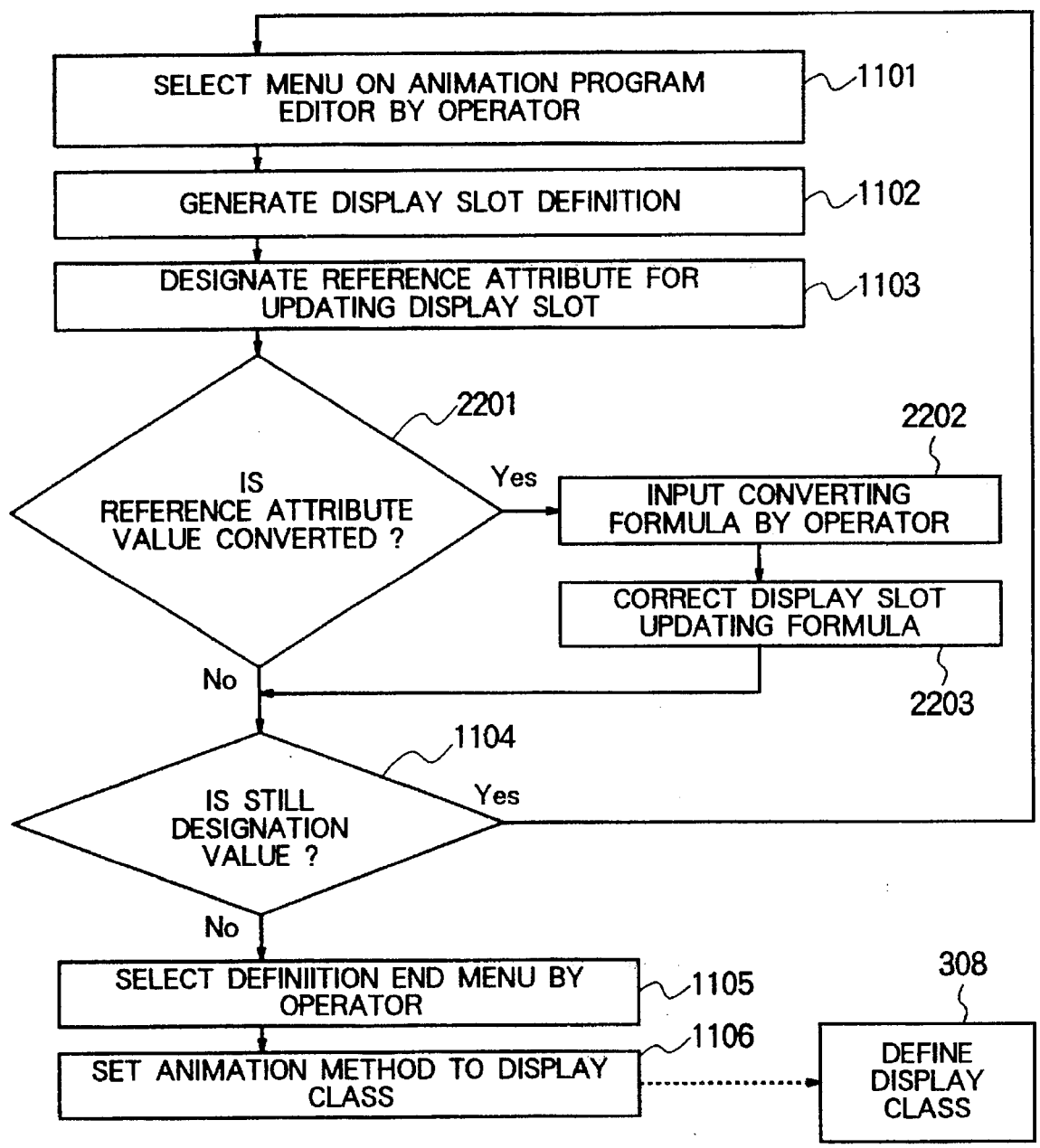
FIG. 31 is a flow chart for representing a sequence to produce and set another animation definition according to a further embodiment of the present invention.

In FIG. 31, there is shown a sequence to produce and set an animation method definition in which character strings and the like are converted to be utilized in the above-explained manner. Since steps 1101 to 1103 and 1104 to 1106 are identical to those of the sequence for generating and setting the animation method definition by the figure element designation and the menu operation of FIG. 12, no further explanation thereof is made.

In FIG. 31, after a designation is made of a reference attribute to update a display slot (step 1103), a judgement is made as to whether or not the reference attribute value is converted (step 2201). In case that the reference attribute value is converted, a converting formula is entered by an operator (step 2202). Then, the description of the attribute reference portion within the display slot updating formula which is generated when the reference attribute is designated to update the display slot (step 1103), is modified into the entered converting formula (step 2203). As a result, the display slot is updated by such a value obtained by converting the reference attribute value.

Figure 32:
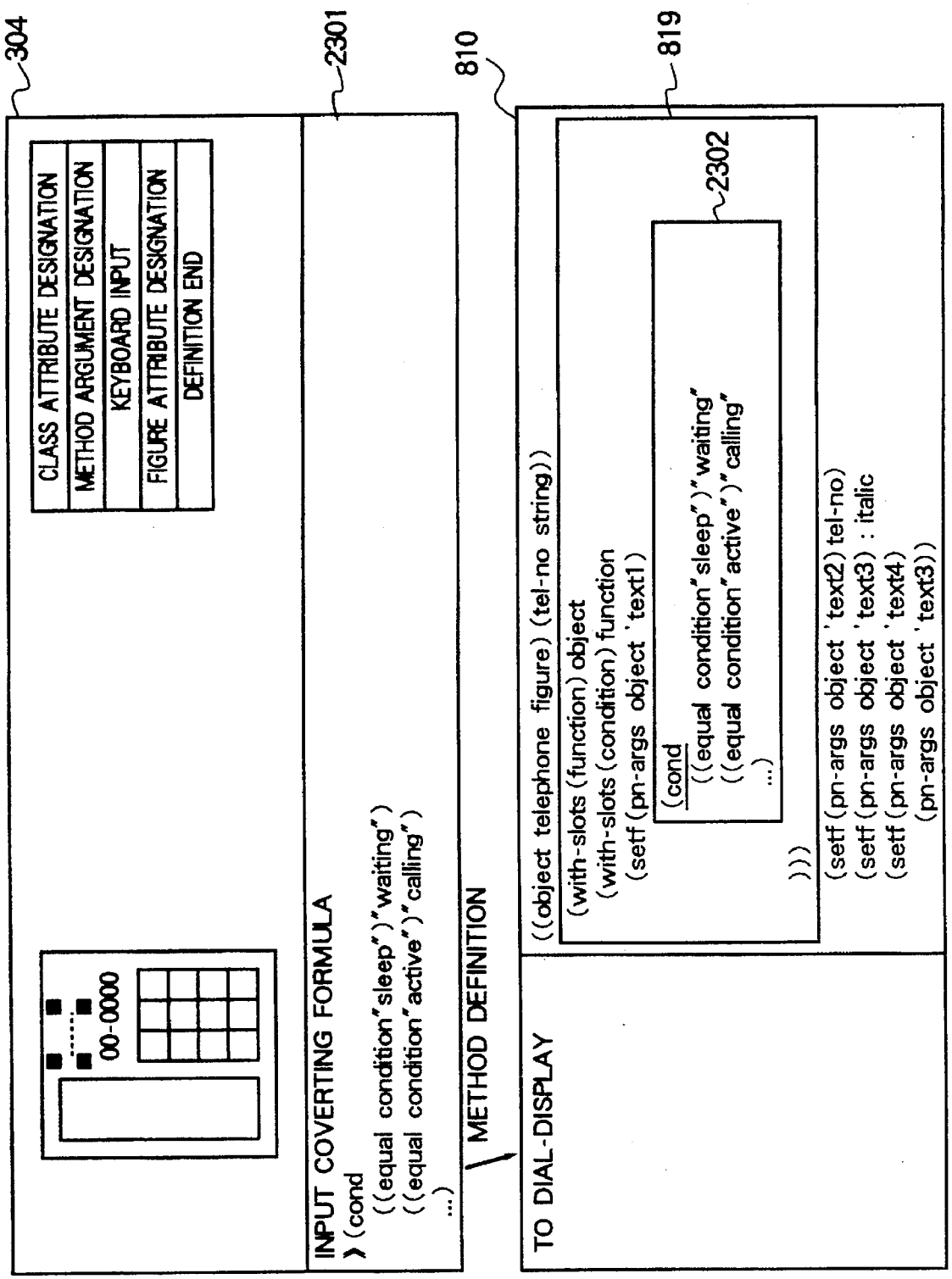
FIG. 32 schematically shows examples of a terminal screen and a method with respect of the embodiment of FIG. 31.

FIG. 32 shows an example of a screen when the converting formula is inputted at the step 2202, and an example of the produced method definition. In this example, as the converting formula, such a conversion is made that if the value of the "condition" slot is "sleep", then it is converted into "waiting", and if the value of the "condition" slot is "active", then it is converted into "on the phone" (2301). Then, the attribute reference portion of the display slot updating formula 819 is substituted by the entered converting formula 2302. As a result, a character string to be displayed may be converted.

Since the attribute reference portions may be substituted by the entered converting formula, various animations may be produced, and thus the results of the simulation may be easily observed.

According to the present invention, the animation program can be automatically produced by only designating the figure element of the user figure corresponding to the object to be animated, and the attributes which are referred to so as to execute the animation with regard to this figure element in the interactive manner. As a consequence, in accordance with the present invention, it is not required to describe the program for the animation every time the simulation result display method is varied, so that the workload on generating of the animation can be reduced. Also, the animation can be simply set, expanded and modified in the interactive manner. There is such an advantage that the simulation result display method of the design supporting system can be flexibly expanded and readily changed.

Furthermore, when the method of the present invention is employed so as to visualize a demanded specification in an upstream of a developing stage for application software (designing stage of demanded specification), the specification proposed by a manufacturer to a client can be correctly represented with easy understanding. Further, the content of the animation display is quickly changed in correspondence with the business sort as well as interests of this client, so that various presentation suitable to the client can be realized.

We claim:

1. An animation generating method for object-oriented design model simulation of a specification of software and a structure of hardware wherein a design model component contained in a consecutive plurality of frames is defined by a design model instance of an object-oriented program, a figure on display is allocated to said design model instance on a computer, and an animation method varies a representation of said figure in connection with interactive generation of a simulated operation of said design model instance, said animation generating method comprising the steps of:

(a) designating one of a slot of said design model instance and a method argument of a method effected to said design model instance;

(b) designating a figure attribute of said figure; and (c) generating an animation method for setting and changing said designated figure attribute based on said designated one of said slot of the design model instance and said method argument of the method effected to said design model instance.

2. The animation generating method as claimed in claim 1 wherein said step for designating one of said slot and said method argument displays a list of one of said slot and said method argument in a menu form, one of said slot and said method argument being selected from said menu form.

3. The animation generating method as claimed in claim 1 wherein said one of said designated slot and said method argument is converted by a predetermined converting formula before being displayed.

4. The animation generating method as claimed in claim 1, said method further comprising the steps of:

designating a method of said design model instance;
   designating a timing sequence with which said animation method is initiated; and generating an animation initiating method for initiating said animation method according to said designated timing sequence.

5. The animation generating method as claimed in claim 4 wherein an animation initiation method containing an initiation condition is further generated for initiating said animation method only when a predetermined initiation conditional formula is satisfied.

6. An animation generating method for object-oriented design model simulation of a specification of software and a structure of hardware wherein a display model component which is repeatedly displayed in a plurality of frames is defined by a design model instance of an object-oriented program, a figure on display is allocated to said design model instance on a computer, and an animation method for varying a representation of said figure in connection with an operation of said design model instance is interactively generated, said animation generating method comprising the steps of:

inputting an attribute value;

designating a figure attribute of said figure; and generating an animation method for setting and changing said figure attribute with reference to said inputted attribute value.

7. An animation generating method for object-oriented design model simulation of a specification of software and a structure of hardware wherein a design model component displayed in a sequence of frames is defined by a design model instance of an object-oriented program, a figure on display is allocated to said design model instance on a computer, and further an animation method for varying a representation of said figure on display in connection with a simulated operation of said design model instance is interactively generated, said animation generating method comprising the steps of:

designating figure attributes for a plurality of other figures, said other figures not including said figure allocated to said design model instance;

designating a figure attribute of said on display figure allocated to said design model instance; and generating an animation method for setting and changing said figure attribute of said on display figure allocated to said design model instance with reference to said figure attributes of said other figures.

8. An animation generating method comprising the steps of:

generating a function class of an object-oriented program for defining a design model component contained in a consecutive plurality of frames to be designed on a computer;

generating a display class for entering a figure corresponding to said function class and for defining said figure;

designating an animation method of said function class and timing of animation initiation;

producing an animation method name corresponding to said designated animation method, and producing an animation initiating method for initiating an animation method corresponding to said animation method name with the designated animation initiation timing, said produced animation name and said produced animation initiating method being set to said function class;

designating a figure element of a figure corresponding to said function class and also a figure attribute of said figure element, setting a display slot for designating said figure attribute of the figure element to the display class, and updating a figure definition of the display class with reference to said display slot;

designating one of a slot variable of said function class and a method argument of a method;

generating an updating formula for updating one of said display slot with employment of said designated slot variable and said designated method argument, and generating an animation method containing said updating formula, said updating formula and said animation method being set to said display class; and performing modeling by a design model instance of said function class, and executing the method of said function class, whereby a simulation is carried out and a simulation result is displayed.

9. The animation generating method as claimed in claim 8 wherein said step for designating one of the slot variable of said function class and the method argument displays a list of one of said slot variable and said method argument in a menu, wherein one of said slot variable and said method argument is selected from said menu.

10. The animation generating method as claimed in claim 8 wherein one of said designated figure attribute and designated figure attributes of other figures are displayed instead of one of said slot variable of the function class and said method argument.

11. An animation generating method in a design supporting system wherein a component of an apparatus to be designed is defined as a function class on a computer system including at least a memory, a terminal having at least a display function and an input function and a CPU, and also a figure of said component is designated as a display class wherein:

a definition of said function class is made of:

a first slot definition group for defining one of an element and an attribute of said component, and a first method definition group for defining function methods corresponding to said functions of the component; and a definition of said display class is made of:

a second slot definition group containing a display slot for defining a figure format of the figure of said component, and a second method definition group containing a display method for drawing a figure of said figure format, said animation generating method for the design supporting system comprising the steps of:

a) requesting an operator to designate a function method cooperative with initiation of an animation by displaying a message on said terminal;

b) after the designation of the function method cooperative with the initiation of the animation, generating a function method having a formula for calling an animation method as one of a postprocessing method of said designated function method and a preprocessing method thereof, said generated function method being added and set into said first method definition group;

c) requesting said operator to designate a figure element to be displayed as an animation among figure elements for constructing the figure of said component;

d) after the designation of the figure element to be displayed as an animation, requesting the operator to designate an attribute of a figure element to be changed in an animation while displaying the attribute of said figure element on said terminal in a menu form;

e) after the designation of the attribute of the figure element to be changed, generating a discriminatable display slot name, adding an additional display slot with said display slot name, and changing a description of a figure definition of said figure element within the display slot for defining said figure format into a description for referring to said additional display slot;

f) requesting the operator to designate an attribute which is referred to so as to update said additional display slot;

g) after the attribute which is referred to so as to update said additional display slot is designated, generating an updating formula of said additional display slot with employment of said attribute; and h) adding and setting an animation method containing the generated updating formula into said second method definition group.

12. The animation generating method as claimed in claim 11 wherein in said step f), while attributes of said component defined in said first slot definition group are displayed in said menu form, said operator is required to select one of said attributes.

13. The animation generating method as claimed in claim 11 wherein in said step f), while method arguments defined in said first method definition group are displayed in said menu form, said operator is requested to selected one of said method arguments as the attribute which is referred to.

14. The animation generating method as claimed in claim 11 wherein in said step f), said operator is requested to input a value of said attribute which is referred to via a keyboard of said terminal by way of a message representation.

15. The animation generating method as claimed in claim 11 wherein in said step f), said operator is requested to select one of said figure elements other than the figure elements designated in said step e), and said operator is further requested to select one of said attributes of said selected figure elements as said attribute to be referred to, while the attributes of the selected figure elements are displayed in said menu form.

16. The animation generating method as claimed in claim 11 wherein said step h) is newly executed by designating completion of the animation definition by said operator, after a series of steps defined from said step d) to said step g) have been repeatedly performed more than one time.

* * * * *